United States Patent
Li et al.

(10) Patent No.: US 11,758,169 B2
(45) Date of Patent: Sep. 12, 2023

(54) BLOCK PARTITIONING AT PICTURE BOUNDARIES

(71) Applicant: Tencent America LLC, Palo Alto, CA (US)

(72) Inventors: Guichun Li, San Jose, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/741,176

(22) Filed: May 10, 2022

(65) Prior Publication Data

US 2022/0272369 A1 Aug. 25, 2022

Related U.S. Application Data

(63) Continuation of application No. 17/085,499, filed on Oct. 30, 2020, now Pat. No. 11,363,285.
(Continued)

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/159* (2014.11);
(Continued)

(58) Field of Classification Search
None
See application file for complete search history.

(56) References Cited

U.S. PATENT DOCUMENTS

| 2018/0070110 A1 | 3/2018 | Chuang et al. |
| 2019/0075328 A1 | 3/2019 | Huang et al. |

(Continued)

FOREIGN PATENT DOCUMENTS

| CN | 110708553 A | 1/2020 |
| WO | 2017123980 A1 | 7/2017 |

(Continued)

OTHER PUBLICATIONS

Bross et al., "Versatile Video Coding (Draft 8)," JVET-Q2001, 17th Meeting: Brussels, BE, Jan. 7-17, 2020 (512 pages).
(Continued)

*Primary Examiner* — Talha M Nawaz
(74) *Attorney, Agent, or Firm* — ARENTFOX SCHIFF LLP

(57) ABSTRACT

A method for video encoding includes determining whether a part of a current block is outside a current picture that is being encoded, and determining whether one of a binary split, a ternary split, or a quaternary split is allowed for the current block in response to the part of the current block being outside the current picture. The method also includes, in response to none of the binary split, the ternary split, and the quaternary split being allowed, determining whether a partition from an implicit binary split is across a virtual pipeline data unit boundary, and applying the implicit binary split to the current block in response to the partition from the implicit binary split not being across the virtual pipeline data unit boundary.

15 Claims, 20 Drawing Sheets

Related U.S. Application Data

(60) Provisional application No. 62/979,184, filed on Feb. 20, 2020.

(51) Int. Cl.
*H04N 19/159* (2014.01)
*H04N 19/176* (2014.01)
*H04N 19/186* (2014.01)
*H04N 19/96* (2014.01)

(52) U.S. Cl.
CPC ......... *H04N 19/176* (2014.11); *H04N 19/186* (2014.11); *H04N 19/96* (2014.11)

(56) References Cited

U.S. PATENT DOCUMENTS

| | | |
|---|---|---|
| 2020/0014946 A1 | 1/2020 | Xu et al. |
| 2020/0037002 A1 | 1/2020 | Xu et al. |
| 2020/0092587 A1 | 3/2020 | Zhao et al. |
| 2021/0004991 A1 | 1/2021 | Zhang et al. |
| 2021/0037237 A1 | 2/2021 | Hsiang |
| 2021/0112247 A1* | 4/2021 | Hsiang ................ H04N 19/44 |
| 2021/0258576 A1* | 8/2021 | LeLeannec .......... H04N 19/157 |
| 2021/0314560 A1* | 10/2021 | Lai ....................... H04N 19/186 |
| 2021/0314630 A1 | 10/2021 | Misra et al. |

FOREIGN PATENT DOCUMENTS

| | | |
|---|---|---|
| WO | 2019194515 A1 | 10/2019 |
| WO | 2019203610 A1 | 10/2019 |
| WO | 2020015592 A1 | 1/2020 |

OTHER PUBLICATIONS

Chen et al., "Algorithm description for Versatile Video Coding and Test Model 8 (VTM 8)," JVET-Q2002, 17th Meeting: Brussels, BE, Jan. 7-17, 2020 (92 pages).

High efficiency video coding, Rec. ITU-T H.265, International Telecommunication Union, Dec. 2016. (664 pages).

Bross et al., "Versatile Video Coding (Draft 7)," JVET-P2001-vE, Joint Video Experts Team (JVET) of ITU-T SG 16 WP 3 and ISO/IEC JTC 1/SC 29/WG 11, 16th Meeting: Geneva, CH, Oct. 1-11, 2019. (488 pages).

Wieckowski et al., "CE1-related: Joint proposal for picture boundary partitioning by Fraunhofer HHI and Huawei", JVET-K0554-v1, Joint Video Experts Team (JVET) of ITU-T SG 16 WP3 and ISO/IEC JTC 1/SC 29/WG 11, 11th Meeting: Ljubljana, SI, Jul. 10-18, 2018. (2 pages).

Hsu et al., "CE1-related: Constraint for binary and ternary partitions", JVET-K0556-v2, Joint Video Experts Team (JVET) of ITU-T SG 16 WP 3 and ISO/IEC JTC 1/SC 29/WG 11, 11th Meeting: Ljubljana, SI, Jul. 10-18, 2018. (3 pages).

Chinese Office Action issued in Application No. 202110176080.6, dated Nov. 29, 2022, with Concise English Translation, 14 pages.

* cited by examiner

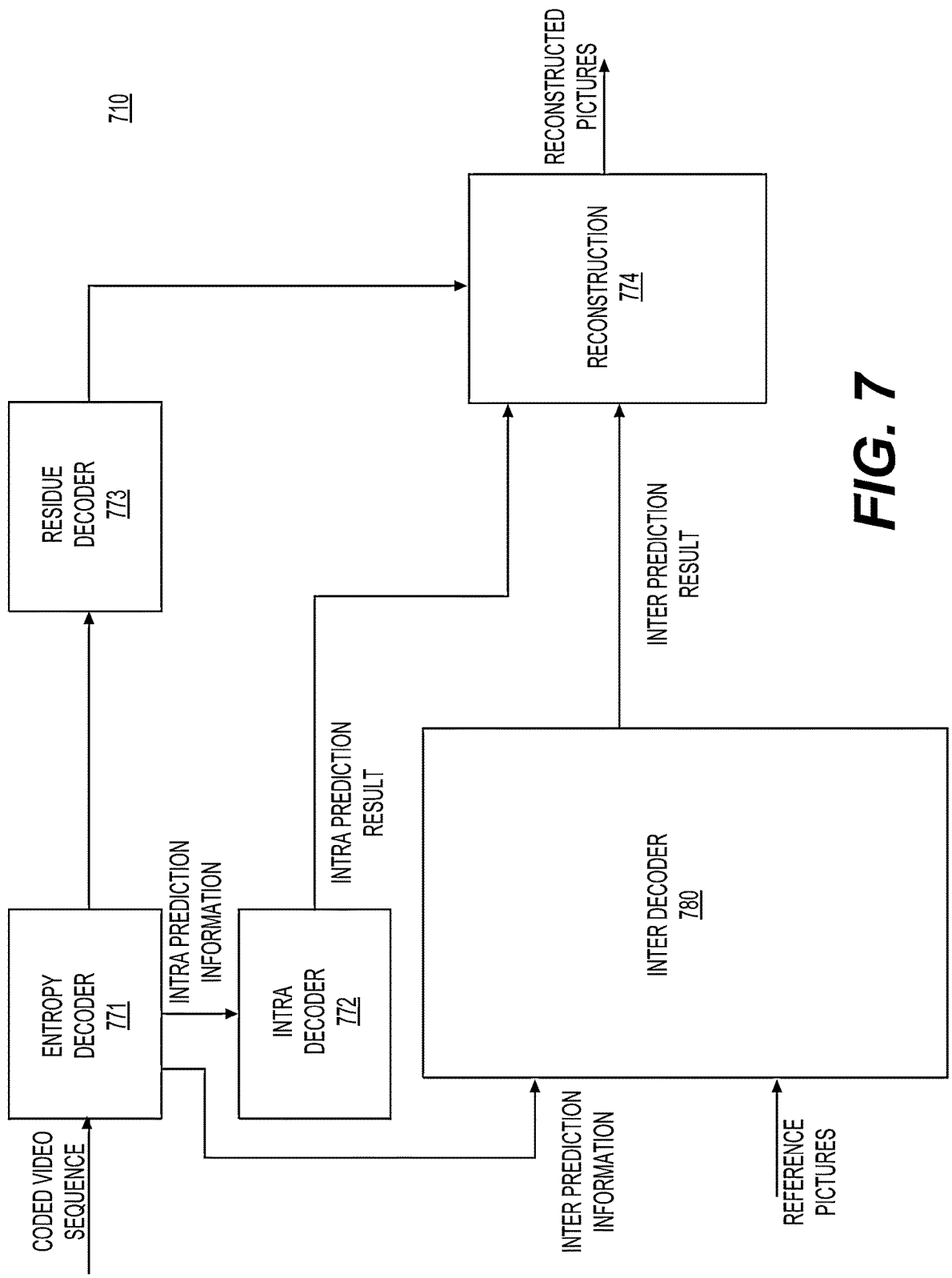

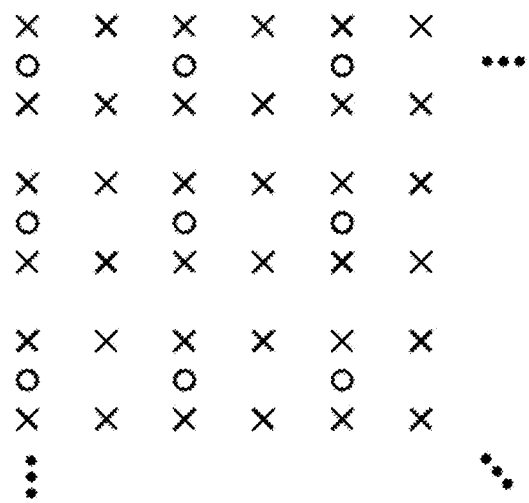
FIG. 8A
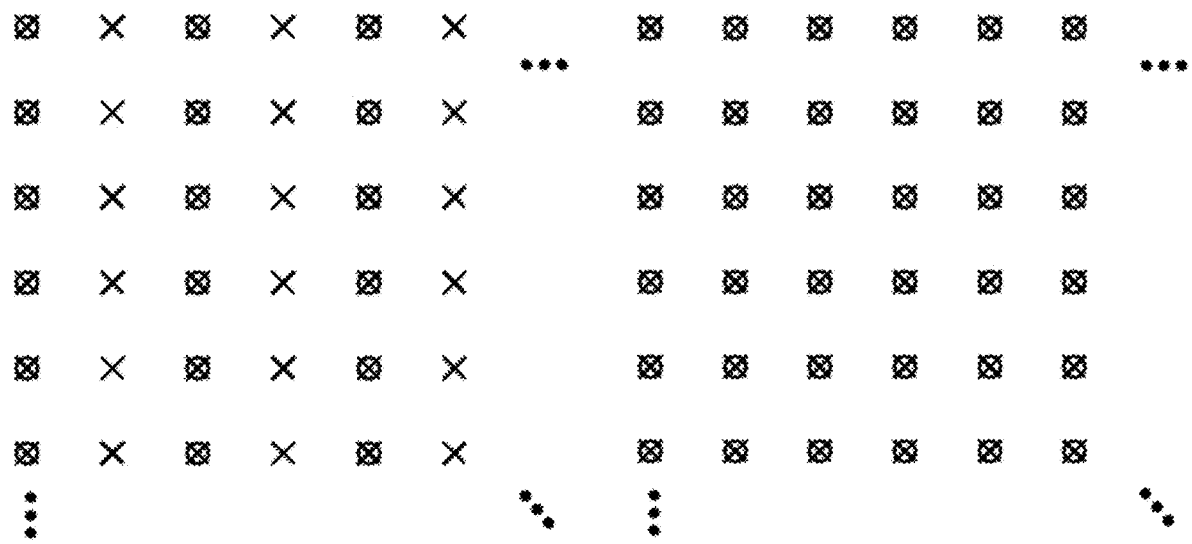
FIG. 8B  FIG. 8C

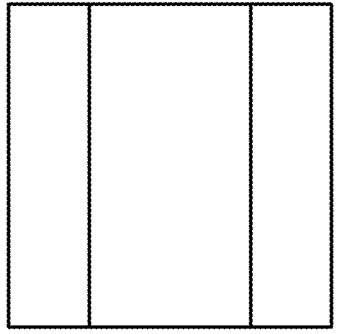
FIG. 10D SPLIT_TT_HOR
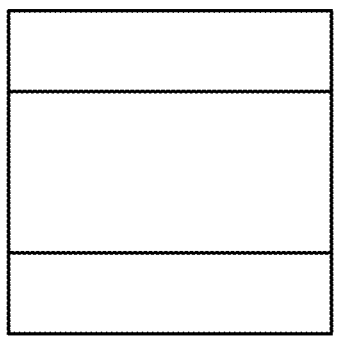
FIG. 10C SPLIT_TT_VER
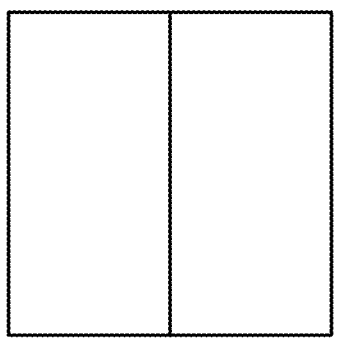
FIG. 10B SPLIT_BT_HOR
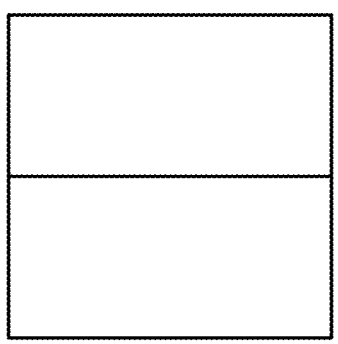
FIG. 10A SPLIT_BT_VER

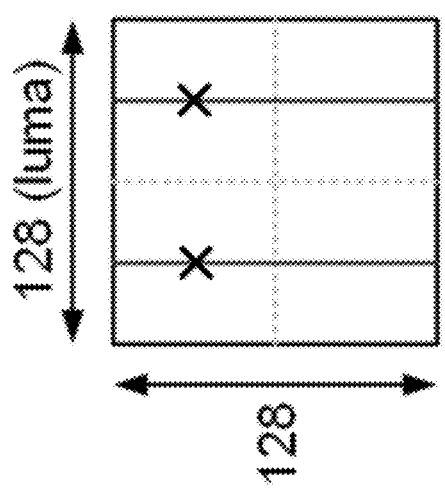
FIG. 15A
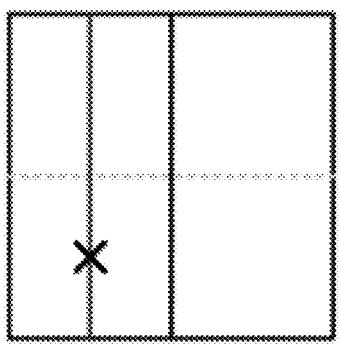
FIG. 15B
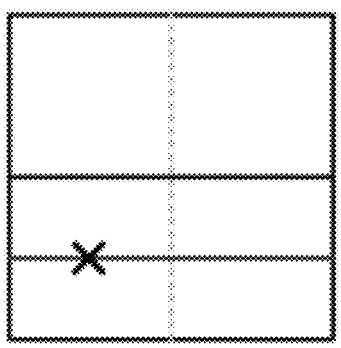
FIG. 15C
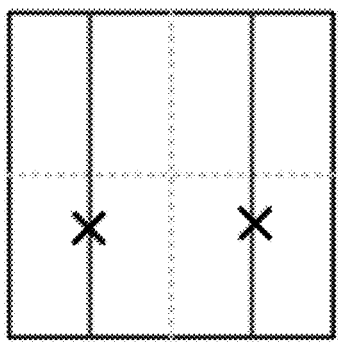
FIG. 15D
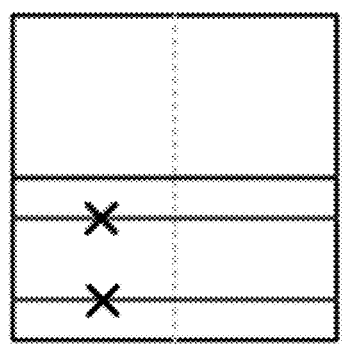
FIG. 15E
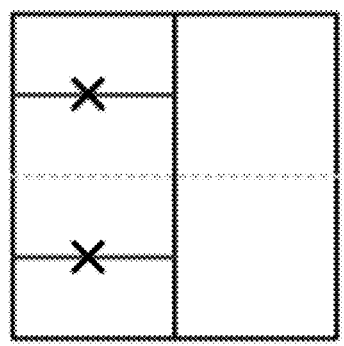
FIG. 15F
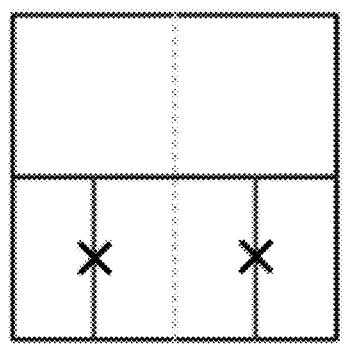
FIG. 15G
FIG. 15H

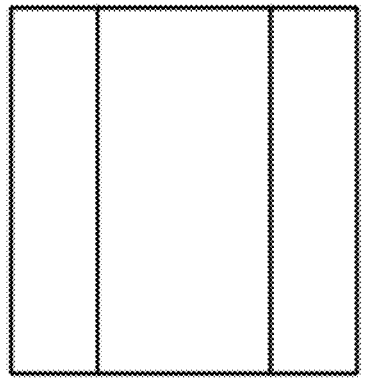
FIG. 16D SPLIT_TT_HOR
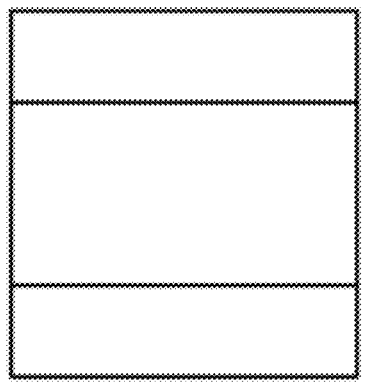
FIG. 16C SPLIT_TT_VER
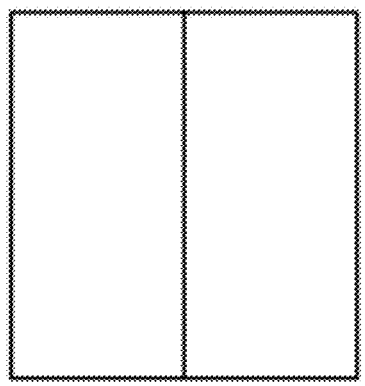
FIG. 16B SPLIT_BT_HOR
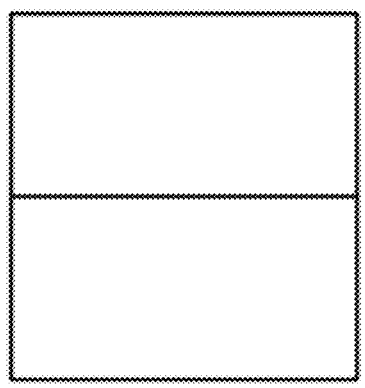
FIG. 16A SPLIT_BT_VER

BLOCK PARTITIONING AT PICTURE BOUNDARIES

INCORPORATION BY REFERENCE

This present application is a continuation of U.S. Ser. No. 17/085,499 filed on Oct. 30, 2020, which claims the benefit of priority to U.S. Provisional Application No. 62/979,184, "METHODS ON BLOCK PARTITIONING AT PICTURE BOUNDARIES" filed on Feb. 20, 2020. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar MV derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1C, a current block (111) can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (112 through 116, respectively). In H.265, the MV prediction can use predictors from the same reference picture that the neighboring block is using.

SUMMARY

Aspects of the disclosure provide apparatuses for video encoding/decoding. An apparatus includes processing circuitry that determines whether a part of a current block of a current picture in a coded video sequence is outside the current picture. The processing circuitry determines whether one of an allowed binary split indicator, an allowed ternary split indicator, and an allowed quaternary split indicator of the current block is true in response to the part of the current block being outside the current picture. The processing circuitry applies an implicit binary split to the current block in response to none of the allowed binary split indicator, the allowed ternary split indicator, and the allowed quaternary split indicator being true.

In an embodiment, the processing circuitry determines whether a sum of an x-axis position of the current block and a width of the current block is greater than a width of the current picture.

In an embodiment, the processing circuitry determines whether a sum of a y-axis position of the current block and a height of the current block is greater than a height of the current picture.

In an embodiment, the processing circuitry determines an initial value of a multi-type tree depth offset as a first value in response to the part of the current block being outside the current picture.

In an embodiment, the processing circuitry determines the initial value of the multi-type tree depth offset as a second value in response to the part of the current block not being outside the current picture.

In an embodiment, the processing circuitry determines a maximum multi-type tree depth of the implicit binary split based on the multi-type tree depth offset.

In an embodiment, the first value is 1 and the second value is 0.

In an embodiment, the current block is intra coded and luma and chroma components of the current block are associated with two separate coding tree structures.

In an embodiment, the processing circuitry determines whether a partition from the implicit binary split is across a virtual process data unit boundary. The processing circuitry applies the implicit binary split to the current block in response to the partition from the implicit binary split not being across the virtual process data unit boundary.

Aspects of the disclosure provide methods for video encoding/decoding. In the method, whether a part of a current block of a current picture in a coded video sequence is outside the current picture is determined. Whether one of an allowed binary split indicator, an allowed ternary split indicator, and an allowed quaternary split indicator of the current block is true is determined in response to the part of the current block being outside the current picture. An implicit binary split is applied to the current block in response to none of the allowed binary split indicator, the allowed ternary split indicator, and the allowed quaternary split indicator being true.

Aspects of the disclosure also provide non-transitory computer-readable mediums storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 7 is a block diagram of a decoder in accordance with another embodiment;

FIG. 8A shows nominal vertical and horizontal locations of 4:2:0 luma and chroma samples in a picture in accordance with an embodiment;

FIG. 8B shows nominal vertical and horizontal locations of 4:2:2 luma and chroma samples in a picture in accordance with an embodiment;

FIG. 8C shows nominal vertical and horizontal locations of 4:4:4 luma and chroma samples in a picture in accordance with an embodiment;

FIGS. 10A-10D show exemplary multi-type tree splitting modes in accordance with an embodiment;

FIGS. 15A-15H show examples of disallowed ternary partitioning and binary partitioning in accordance with an embodiment;

FIGS. 16A-16D show exemplary multi-type tree splitting modes in accordance with an embodiment;

DETAILED DESCRIPTION OF EMBODIMENTS

I. Video Decoder and Encoder Systems

Figure 1A:
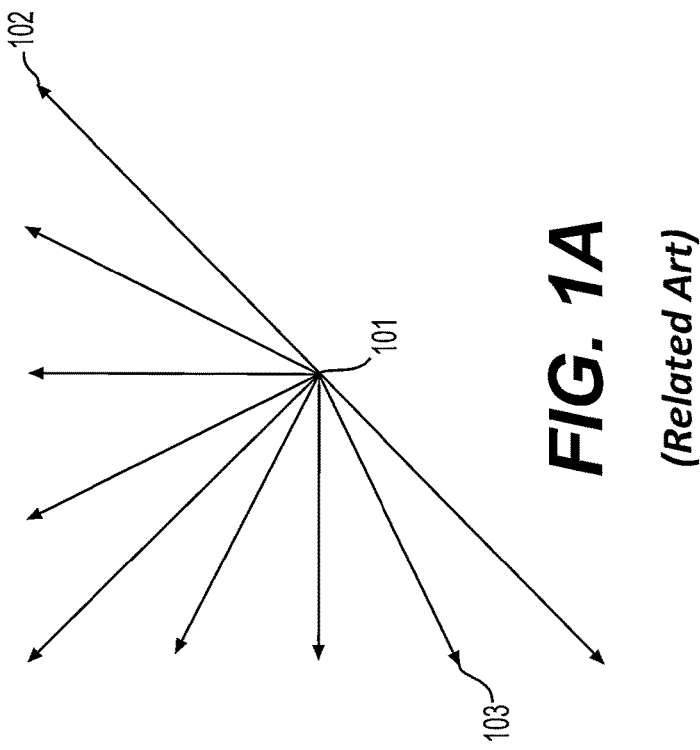
FIG. 1A is a schematic illustration of an exemplary subset of intra prediction modes.
Figure 1B:
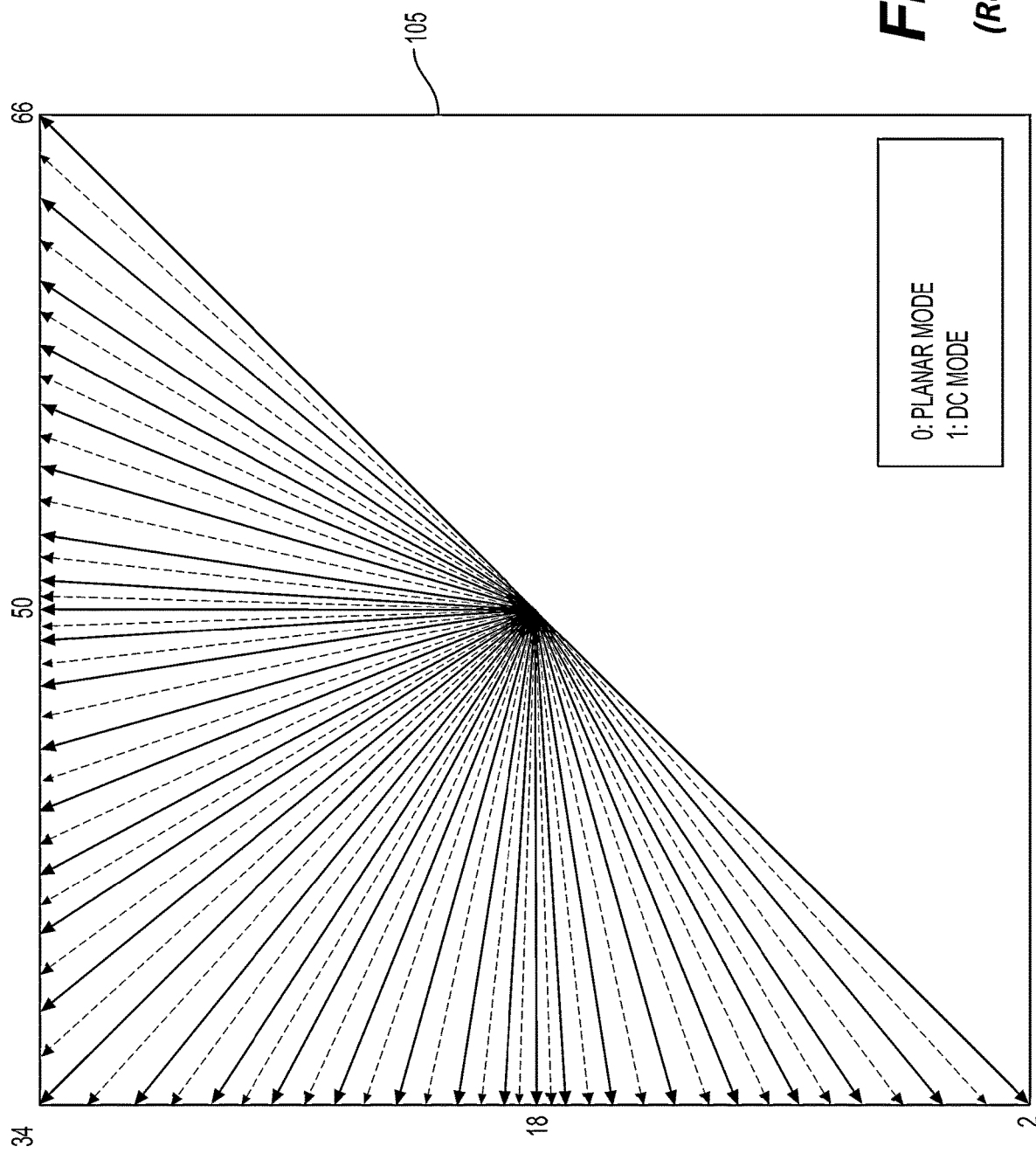
FIG. 1B is an illustration of exemplary intra prediction directions.
Figure 1C:
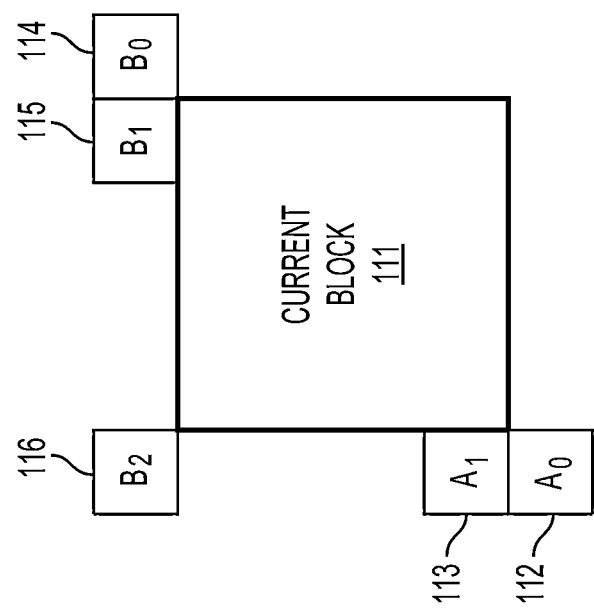
FIG. 1C is a schematic illustration of a current block and its surrounding spatial merge candidates in one example.
Figure 2:
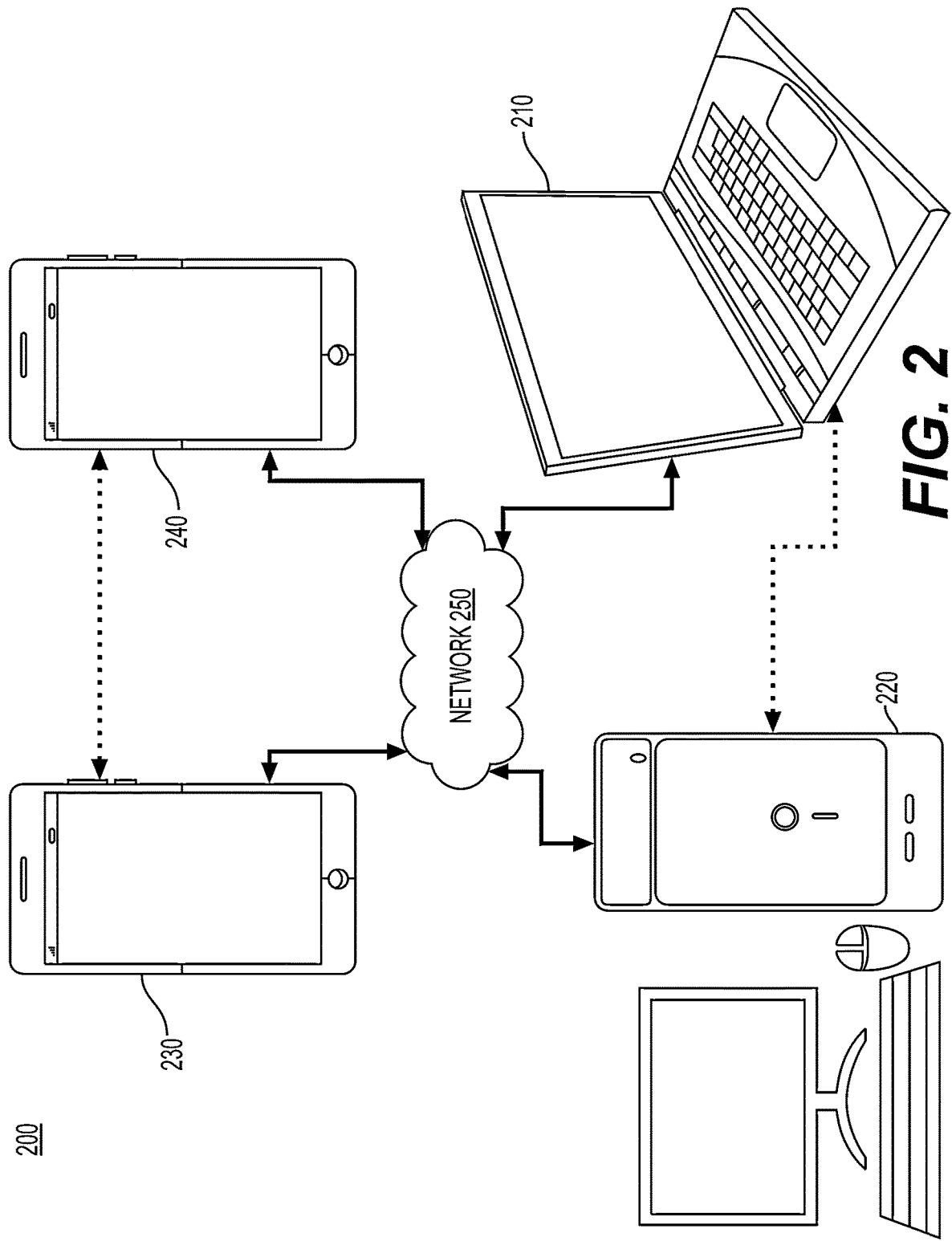
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240)

that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
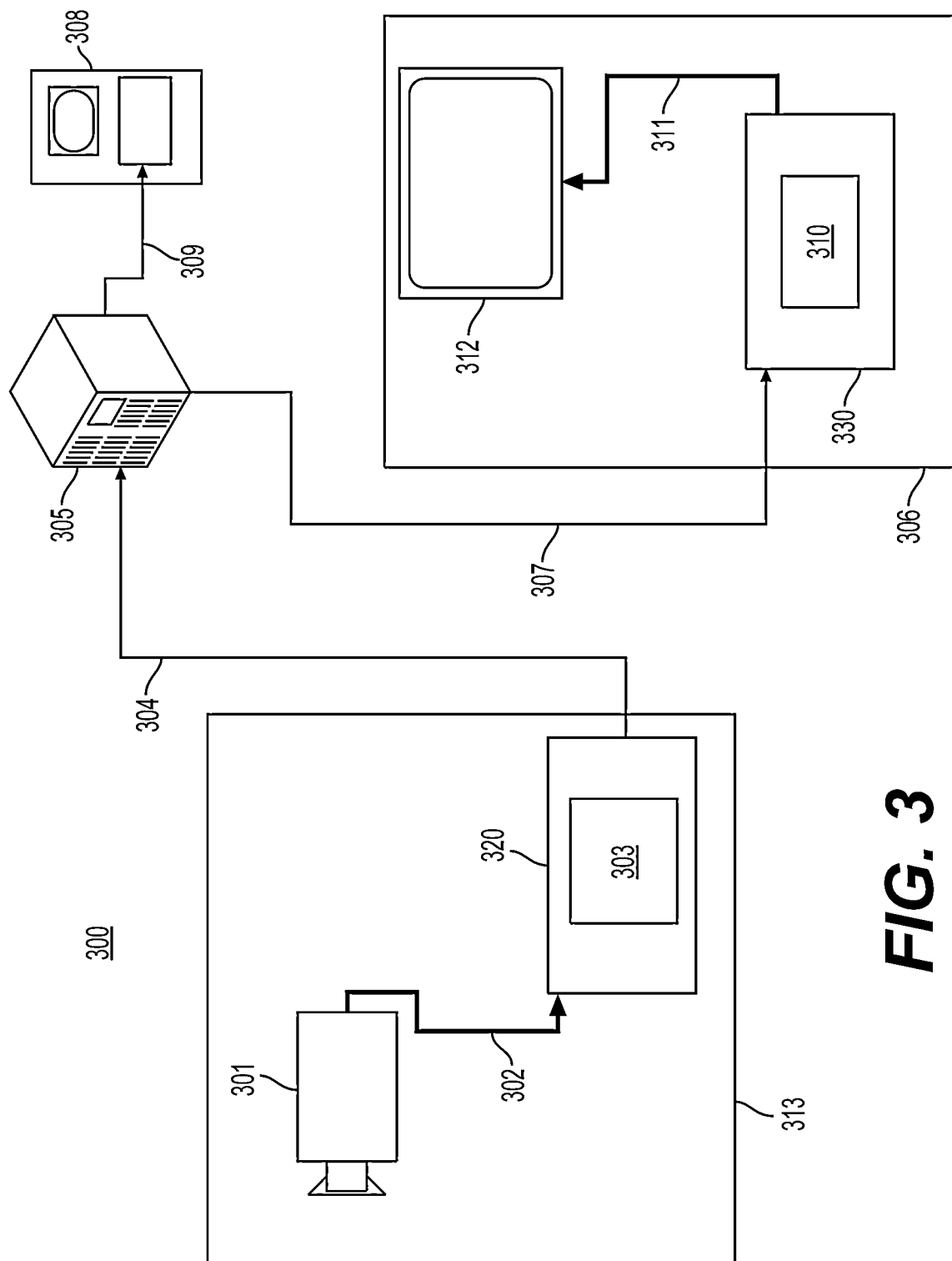
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
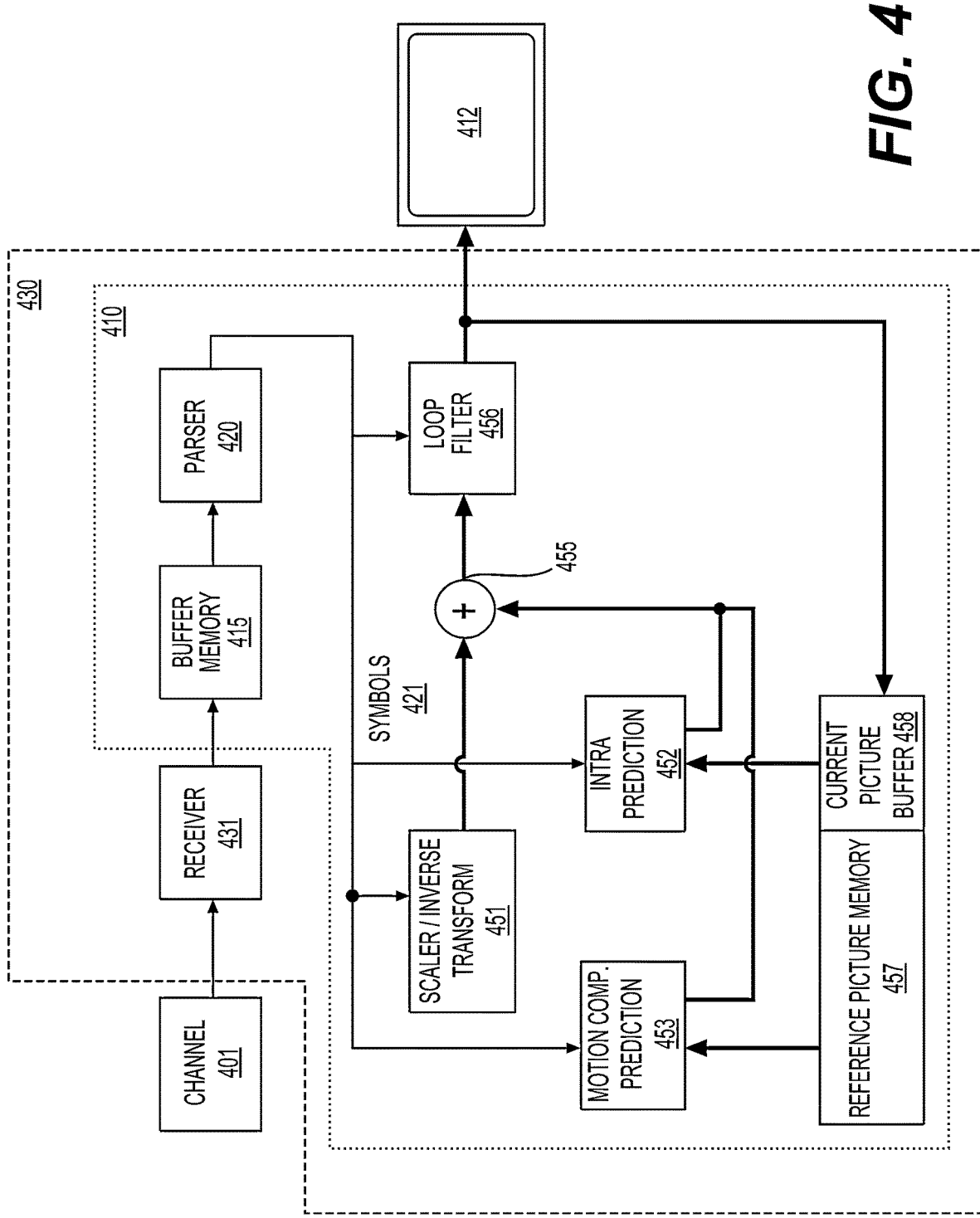
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, MVs, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by MVs, available to the motion compensation prediction unit (453) in the form of symbols (421) that can have, for example X, Y, and reference picture components. Motion compensation also can include interpolation of sample values as fetched from the reference picture memory (457) when sub-sample exact MVs are in use, MV prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
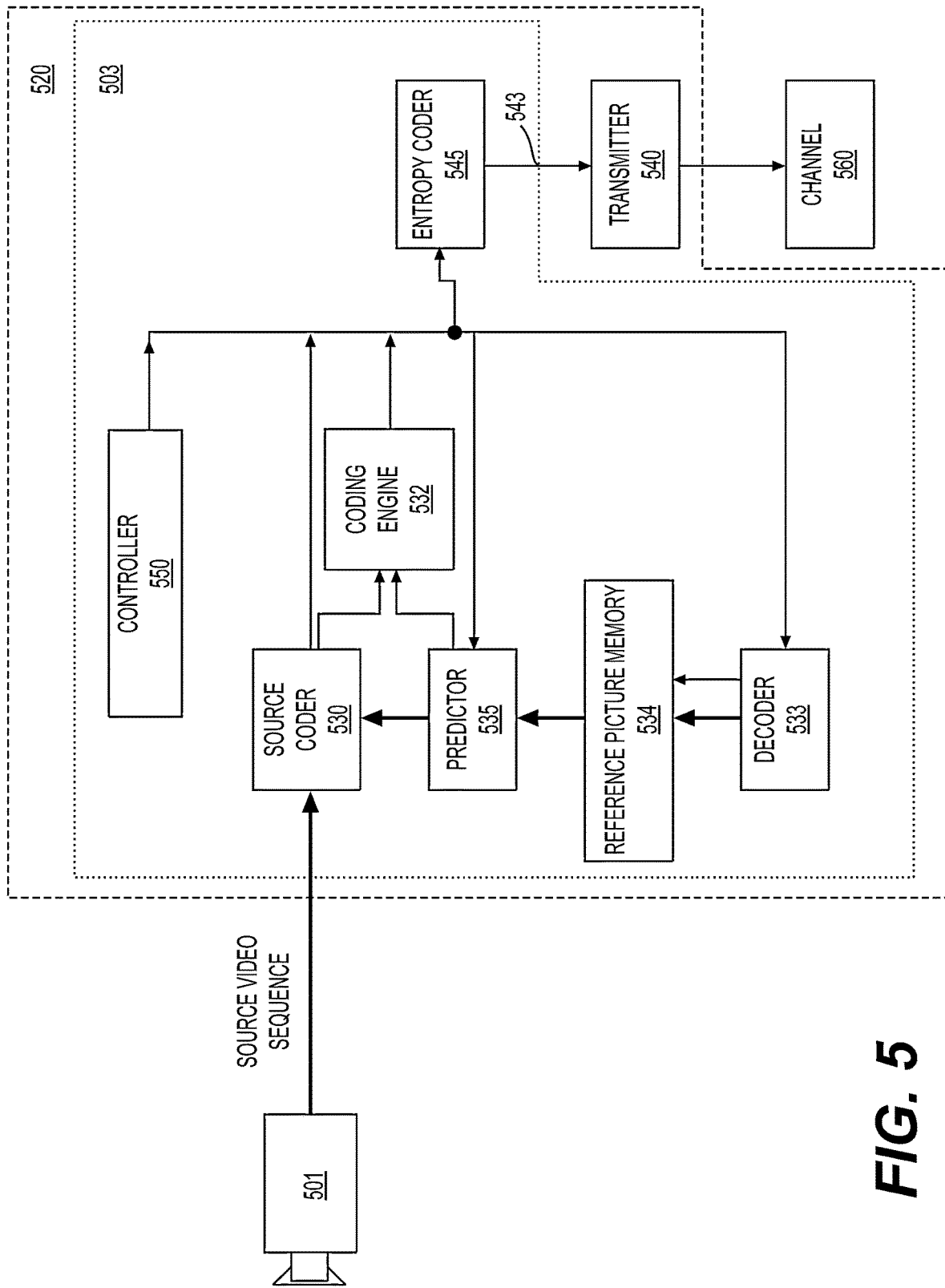
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum MV allowed reference area, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture MVs, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one MV and reference index to predict the sample values of each block.

A bi-directionally predictive picture (B Picture) may be one that may be coded and decoded using intra prediction or inter prediction using at most two MVs and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a MV. The MV points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first MV that points to a first reference block in the first reference picture, and a second MV that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
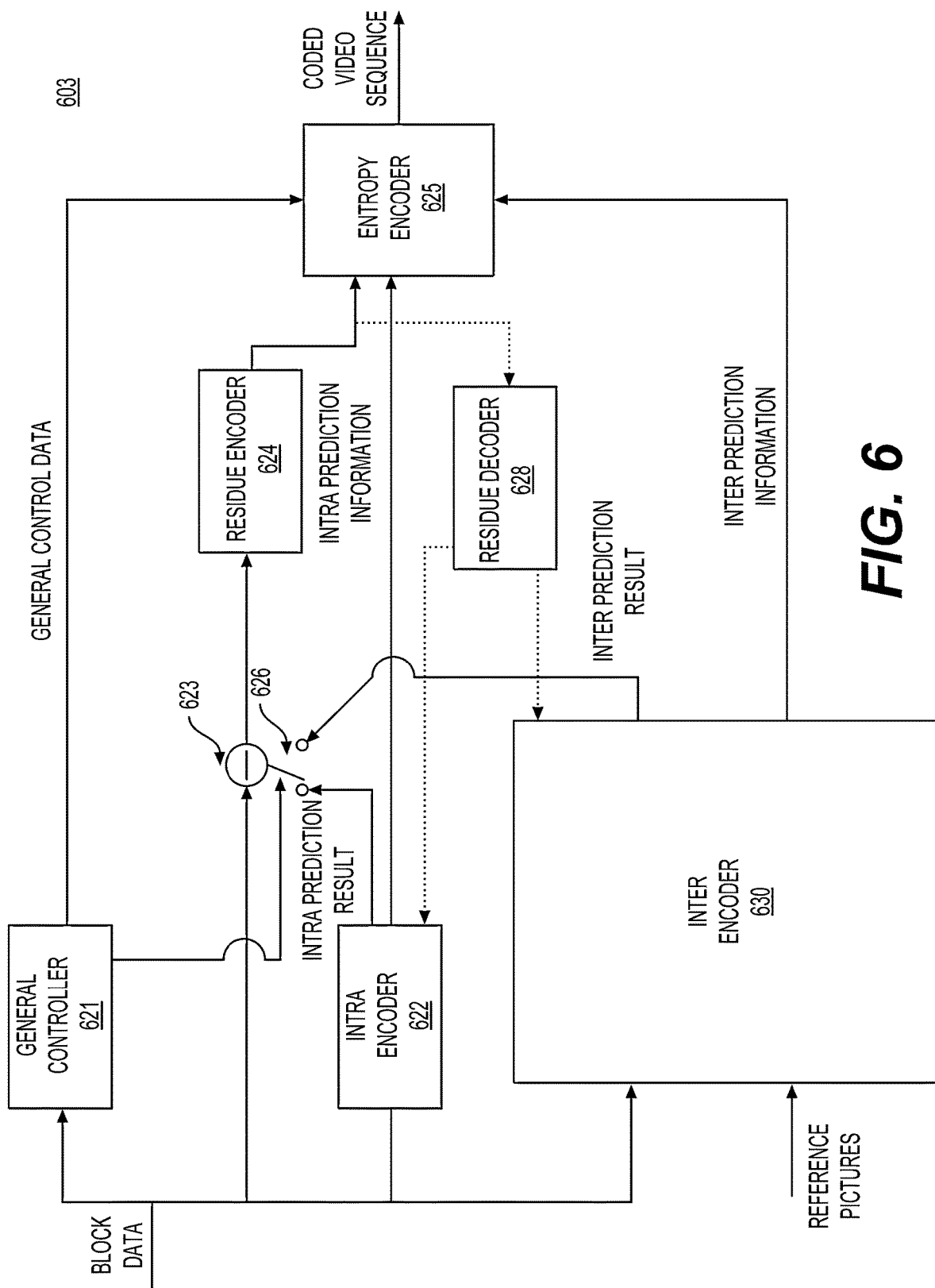
FIG. 6 is a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the MV is derived from one or more MV predictors without the benefit of a coded MV component outside the predictors. In certain other video coding technologies, a MV component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, MVs, merge mode information), and calculate inter prediction results (e.g., prediction block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., prediction block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard such as HEVC. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. Source, Decoded, And Output Picture Formats

According to aspects of the disclosure, the video source that is represented by the bitstream is a sequence of pictures in decoding order. The source and decoded pictures are each comprised of one or more the following sample arrays: (i) luma (Y) only (monochrome); (ii) luma and two chroma (YCbCr or YCgCo); (iii) green, blue, and red (GBR, also known as RGB); and (iv) arrays representing other unspecified monochrome or tri-stimulus color samplings (e.g., YZX, is also known as XYZ).

In some related examples, the variables and terms associated with these arrays are referred to as luma (or L or Y) and chroma, where the two chroma arrays are referred to as Cb and Cr, regardless of the actual color representation method in use. The actual color representation method in use can be indicated by syntax.

For example, in Table 1, the variables SubWidthC and SubHeightC are dependent on the chroma format sampling structure, which is specified through the variables chroma_format_idc and separate_colour_plane_flag. Other values of chroma_format_idc, SubWidthC, and SubHeightC can be specified in some related examples.

In monochrome sampling, there is only one sample array, which is nominally considered the luma array. In 4:2:0 sampling, each of the two chroma arrays has half the height and half the width of the luma array. In 4:2:2 sampling, each of the two chroma arrays has the same height and half the width of the luma array. In 4:4:4 sampling, if separate colour plane flag is equal to 0, each of the two chroma arrays has the same height and width as the luma array. Otherwise (separate_colour_plane_flag is equal to 1), the three colour planes are separately processed as monochrome sampled pictures.

The number of bits for the representation of each of the samples in the luma and chroma arrays in a video sequence can be in the range of 8 to 16, inclusive, and the number of bits used in the luma array can differ from the number of bits used in the chroma arrays.

When the value of chroma_format_idc is equal to 1, the nominal vertical and horizontal relative locations of luma and chroma samples in pictures are shown in FIG. 8A. Alternative chroma sample relative locations can be indicated in video usability information.

When the value of chroma_format_idc is equal to 2, the chroma samples are co-sited with the corresponding luma samples and the nominal locations in a picture are as shown in FIG. 8B.

When the value of chroma_format_idc is equal to 3, all array samples are co-sited for all cases of pictures and the nominal locations in a picture are as shown in FIG. 8C.

III. Partitioning in VVC

In some related examples such as HEVC and VVC, pictures can be divided into a sequence of CTUs. For a picture that has three sample arrays, a CTU includes an N×N block of luma samples together with two corresponding blocks of chroma samples. FIG. 9A shows an example of a picture divided into CTUs. The maximum allowed size of the luma block in a CTU can be specified to be 128×128, although the maximum size of the luma transform blocks can be 64×64.

According to aspects of the disclosure, a picture can be divided into one or more tile rows and one or more tile columns. A tile can be a sequence of CTUs that covers a rectangular region of a picture. A tile can be divided into one or more bricks, each of which includes a number of CTU rows within the tile. A tile that is not partitioned into multiple bricks can also be referred to as a brick. However, a brick that is a true subset of a tile is not referred to as a tile. A slice either includes a number of tiles of a picture or a number of bricks of a tile.

In some related examples, two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | picture. The bricks within a rectangular slice are in the order of brick raster scan of the slice.

Figure 9B:
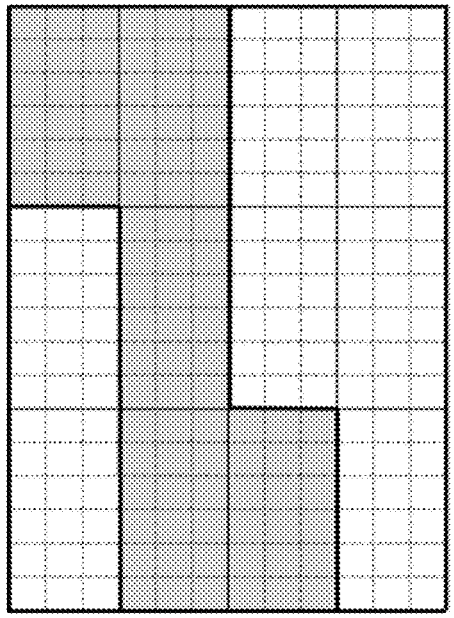
FIG. 9B shows an example of a picture partitioned into tiles and raster-scan slices in accordance with an embodiment.
Figure 9D:
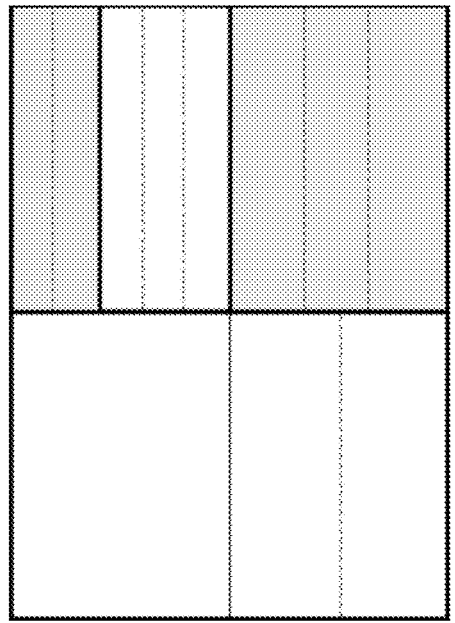
FIG. 9D shows an example of a picture partitioned into tiles, bricks, and rectangular slices in accordance with an embodiment.
Figure 9A:
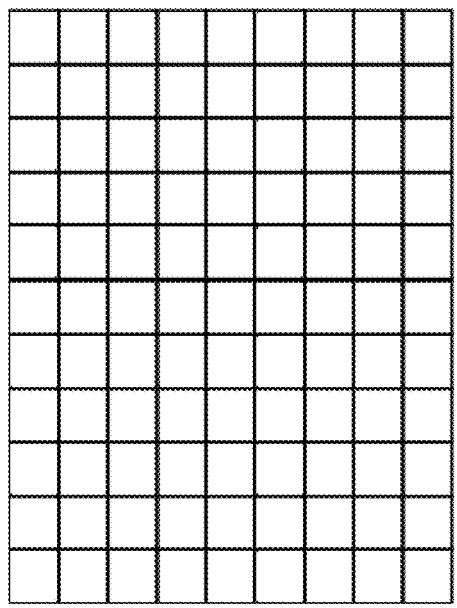
FIG. 9A shows an example of a picture divided into coding tree units in accordance with an embodiment.
Figure 9C:
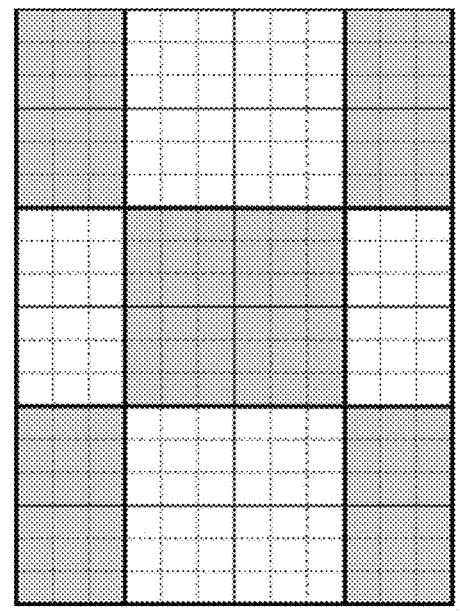
FIG. 9C shows an example of a picture partitioned into tiles and rectangular slices in accordance with an embodiment.

FIG. 9B shows an example of raster-scan slice partitioning of a picture, where the picture is divided into 12 tiles and 3 raster-scan slices. FIG. 9C shows an example of rectangular slice partitioning of a picture, where the picture is divided into 24 tiles (6 tile columns and 4 tile rows) and 9 rectangular slices. FIG. 9D shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

In some related examples such as HEVC, a CTU can be split into CUs by using a quaternary-tree structure denoted as a coding tree to adapt to various local characteristics. The decision whether to code a picture area using inter-picture (temporal) or intra-picture (spatial) prediction can be made at the leaf CU level. Each leaf CU can be further split into one, two, or four PUs according to the PU splitting type. Inside one PU, the same prediction process can be applied and the relevant information can be transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One feature of the HEVC structure is that it has multiple partition conceptions including CU, PU, and TU.

In some related examples such as VVC, a quadtree with nested multi-type tree using binary and ternary splits segmentation structure replaces the concepts of multiple partition unit types. That is, the quadtree with nested multi-type tree removes the separation of the CU, PU, and TU concepts except as needed for CUs that have a size too large for the maximum transform length, and supports more flexibility for CU partition shapes. In the coding tree structure, a CU can have either a square or rectangular shape. A CTU can be first partitioned by a quaternary tree (referred to as quadtree) structure. Then the quaternary tree leaf nodes can be further partitioned by a multi-type tree structure. As shown in FIGS. 10A-10D, there are four splitting types in the multi-type tree structure, which are vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs. Unless the CU is too large for the maximum transform length, this segmentation can be used for prediction and transform processing without any further partitioning. This means that, in most cases, the CU, PU, and TU can have the same block size in the quadtree with the nested multi-type tree coding block structure. The exception occurs when the maximum supported transform length is smaller than the width or height of the color component of the CU.

Figure 11:
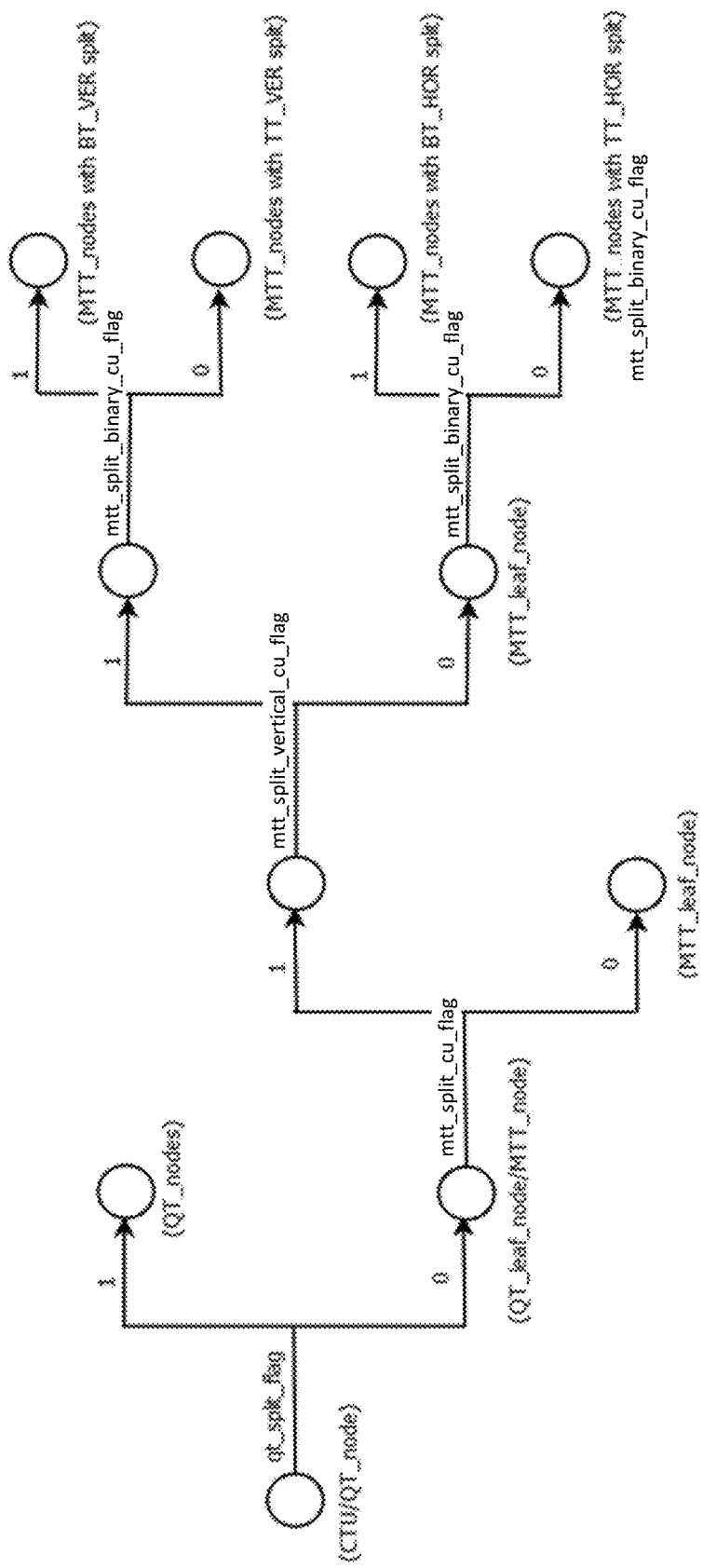
FIG. 11 shows signaling for exemplary splitting flags in quadtree with a nested multi-type tree coding tree structure in accordance with an embodiment.

FIG. 11 illustrates an exemplary signaling mechanism of the partition splitting information in quadtree with a nested multi-type tree coding tree structure according to an embodiment of the disclosure. A CTU can be treated as a root of a quaternary tree and first partitioned by a quaternary tree structure. A quaternary tree leaf node can then be further partitioned by a multi-type tree structure if allowed. In the multi-type tree structure, a first flag (e.g., mtt_split_cu_flag) can be signaled to indicate whether the node is further partitioned. When the node is determined to be further partitioned, a second flag (e.g., mtt_split_cu_vertical_flag) can be signaled to indicate a splitting direction, and then a third flag (e.g., mtt_split_cu_binary_flag) can be signaled to indicate whether the split is a binary split or a ternary split. Based on the values of mtt_split_cu_vertical_flag and mtt_split_cu_binary_flag, the multi-type tree splitting mode (MttSplitMode) of a CU can be derived as shown in Table 2.

TABLE 2

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 12:
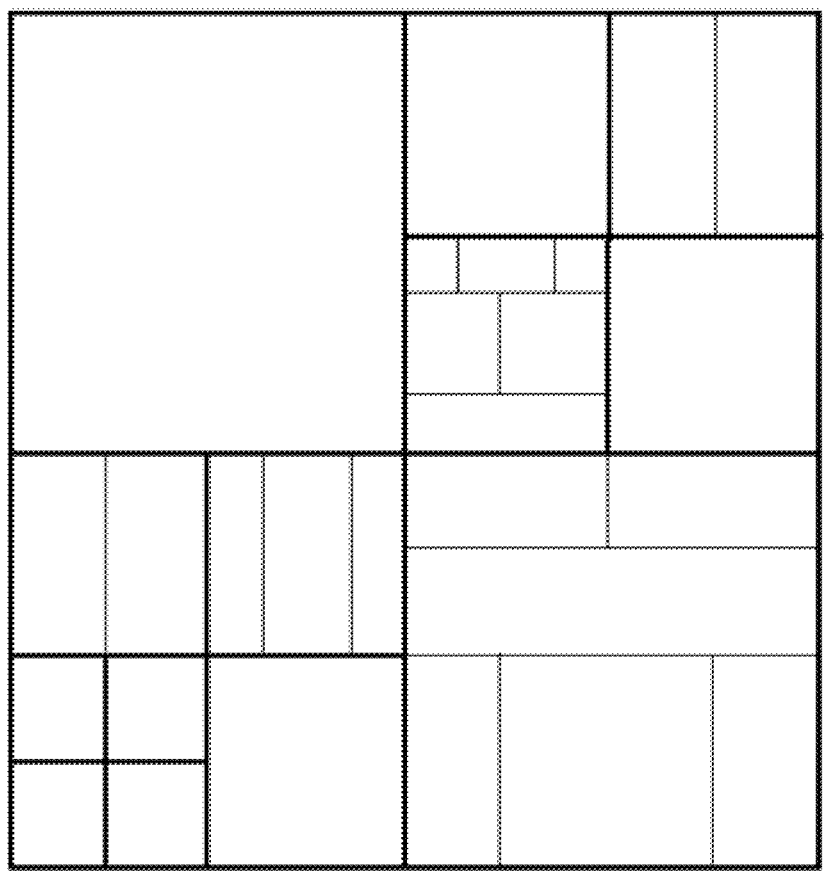
FIG. 12 shows an example of a quadtree with a nested multi-type tree coding block structure in accordance with an embodiment.
Figure 13A:
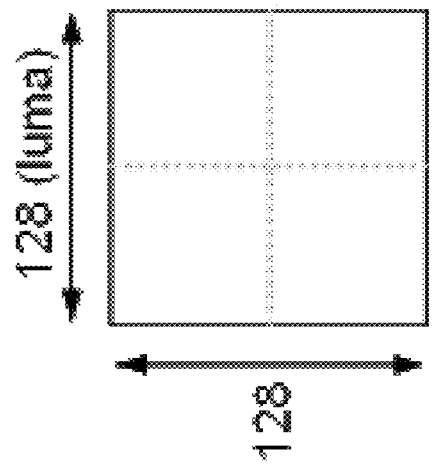
FIGS. 13A-13E show exemplary coding blocks in which ternary split is not allowed in accordance with an embodiment.
Figure 13B:
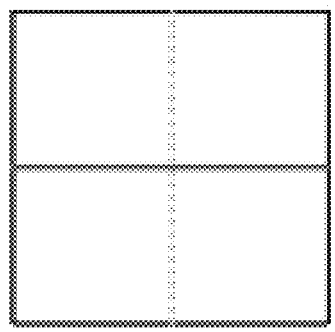
Figure 13C:
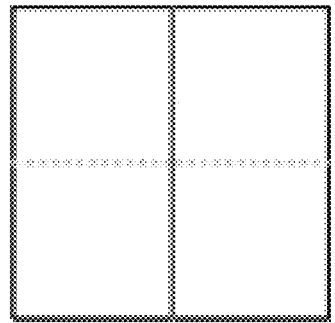
Figure 13D:
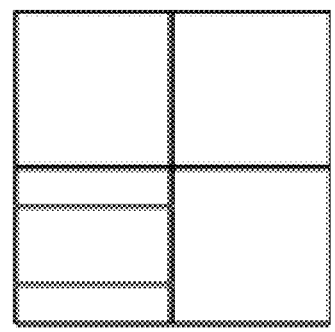
Figure 13E:
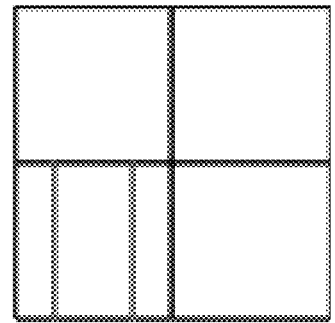
Figure 14D:
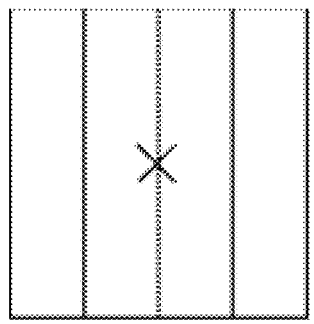
FIGS. 14A-14D show exemplary redundant splitting patterns of binary tree split and ternary tree split in accordance with an embodiment.
Figure 14C:
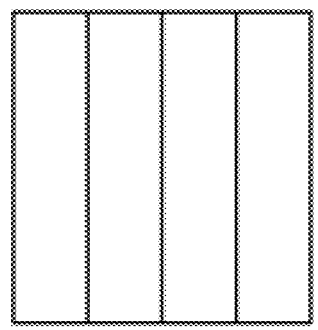
Figure 14B:
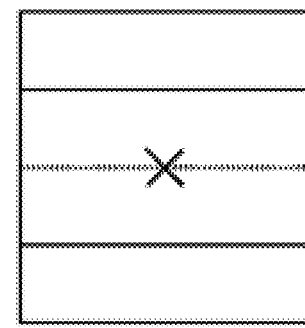
Figure 14A:
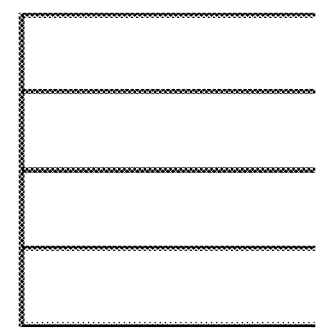

FIG. 12 shows an exemplary CTU divided into multiple CUs with a quadtree and a nested multi-type tree coding block structure, where the bold block edges represent quadtree partitioning and the remaining edges represent multi-type tree partitioning. The quadtree with the nested multi-type tree partition can provide a content-adaptive coding tree structure comprised of CUs. The size of the CU can be as large as the CTU or as small as 4×4 in units of luma samples. For the case of the 4:2:0 chroma format, the maximum chroma CB size can be 64×64 and the minimum chroma CB size can be 2×2.

In some related examples such as VVC, the maximum supported luma transform size can be 64×64 and the maximum supported chroma transform size can be 32×32. When the width or height of the CB is larger than the maximum transform width or height, the CB can be automatically split in the horizontal and/or vertical direction to meet the transform size restriction in the corresponding direction.

The following parameters are defined and specified by sequence parameter set (SPS) syntax elements for the quadtree with a nested multi-type tree coding tree scheme: (i) CTU size that is the root node size of a quaternary tree; (ii) MinQTSize that is the minimum allowed quaternary tree leaf node size; (iii) MaxBtSize that is the maximum allowed binary tree root node size; (iv) MaxTtSize that is the maximum allowed ternary tree root node size; (v) MaxMttDepth that is the maximum allowed hierarchy depth of multi-type tree splitting from a quadtree leaf; (vi) MinBtSize that is the minimum allowed binary tree leaf node size; and (vii) MinTtSize that is the minimum allowed ternary tree leaf node size.

In one example of the quadtree with a nested multi-type tree coding tree structure, the CTU size can be set as 128×128 luma samples with two corresponding 64×64 blocks of 4:2:0 chroma samples, the MinQTSize can be set as 16×16, the MaxBtSize can be set as 128×128 and MaxTtSize can be set as 64×64, the MinBtSize and MinTtSize (for both width and height) can be set as 4×4, and the MaxMttDepth can be set as 4. The quaternary tree partitioning can be applied to the CTU first to generate quaternary tree leaf nodes. The quaternary tree leaf nodes can have a size from the MinQTSize (e.g., 16×16) to the CTU size (e.g., 128×128). If the leaf QT node is 128×128, it cannot be further split by the binary tree since the size exceeds the MaxBtSize and MaxTtSize (e.g., 64×64). Otherwise, the leaf QT node can be further partitioned by the multi-type tree. Therefore, the quaternary tree leaf node can also be the root node for the multi-type tree and have a multi-type tree depth (mttDepth) of 0. When the multi-type tree depth reaches MaxMttDepth (e.g., 4), no further splitting is considered. When the width of the multi-type tree node is equal to MinBtSize and smaller or equal to 2*MinTtSize, no further horizontal splitting is considered. Similarly, when the height of the multi-type tree node is equal to MinBtSize and smaller or equal to 2*MinTtSize, no further vertical splitting is considered.

In some related cases such as VVC, to allow 64×64 luma block and 32×32 chroma pipelining design in hardware decoders, TT split is forbidden when either a width or a height of a luma coding block is larger than 64, as shown in FIGS. 13A-13E. TT split is also forbidden when either a width or a height of a chroma coding block is larger than 32.

In some related cases such as VVC, the coding tree scheme can support the ability for the luma and chroma to have a separate block tree structure. In an example, for P and B slices, the luma and chroma CTBs in one CTU have to share the same coding tree structure. However, for I slices, the luma and chroma can have separate block tree structures. When a separate block tree mode is applied, the luma CTB can be partitioned into CUs by using one coding tree structure, and the chroma CTBs can be partitioned into chroma CUs by using another coding tree structure. This means that a CU in an I slice can include, or consist, of a coding block of the luma component or coding blocks of two chroma components, and a CU in a P or B slice can include coding blocks of all three color components unless the video is monochrome.

According to aspects of the disclosure, when a portion of a tree node block exceeds the bottom or right picture boundary, the tree node block can be forced to be split until samples (e.g., all samples) of every coded CU are located inside the picture boundaries. The following splitting rules can be applied in some related examples such as VVC.

In an embodiment, a portion of a tree node block exceeds both the bottom and the right picture boundaries. If the block is a QT node and the size of the block is larger than the minimum QT size (e.g., 16×16), the block can be forced to be split with QT split mode. Otherwise, the block can be forced to be split with SPLIT_BT_HOR mode.

In an embodiment, a portion of a tree node block exceeds the bottom picture boundaries. If the block is a QT node and the size of the block is larger than both the minimum QT size and the maximum BT size (e.g., 128×128), the block can be forced to be split with the QT split mode. Otherwise, if the block is a QT node and the size of the block is larger than the minimum QT size and smaller than or equal to the maximum BT size, the block can be forced to be split with the QT split mode or SPLIT_BT_HOR mode. Otherwise, if the block is an MTT node or the size of the block is smaller than or equal to the minimum QT size, the block can be forced to be split with SPLIT_BT_HOR mode.

In an embodiment, a portion of a tree node block exceeds the right picture boundaries. If the block is a QT node and the size of the block is larger than both the minimum QT size and the maximum BT size, the block can be forced to be split with the QT split mode. Otherwise, if the block is a QT node and the size of the block is larger than the minimum QT size and smaller than or equal to the maximum BT size, the block can be forced to be split with the QT split mode or SPLIT_BT_VER mode. Otherwise, if the block is an MTT node or the size of the block is smaller than or equal to the minimum QT size, the block can be forced to be split with SPLIT_BT_VER mode.

The quadtree with a nested multi-type tree coding block structure can provide a highly flexible block partitioning structure. Due to the types of splits in the multi-type tree, different splitting patterns can potentially result in the same coding block structure. In some related examples such as VVC, some of these redundant splitting patterns can be disallowed.

FIGS. 14A-14D illustrate exemplary redundant splitting patterns of binary tree splits and ternary tree splits according to an embodiment of the disclosure. Two levels of consecutive binary splits in one direction can have the same coding block structure as a ternary tree split followed by a binary tree split of the central partition. In this case, the binary tree split in the given direction for the central partition of a ternary tree split can be prevented by the syntax. This restriction can apply for CUs in all pictures.

When the splits are prohibited as described above, signaling of the corresponding syntax elements can be modified to account for the prohibited cases. For example, when any case in FIGS. 14A-14D is identified (e.g., the binary split is prohibited for a CU of a central partition), the syntax element mtt_split_cu_binary flag that specifies whether the split is a binary split or a ternary split is inferred to be equal to 0 by the decoder instead of being signaled.

According to aspects of the disclosure, virtual pipeline data units (VPDUs) are defined as non-overlapping units in a picture. In hardware decoders, successive VPDUs are processed by multiple pipeline stages at the same time. The VPDU size can be proportional to the buffer size in most pipeline stages, so it is important to keep the VPDU size small. In some hardware decoders, the VPDU size can be set to the maximum transform block (TB) size. However, in some related examples such as VVC, TT and BT partitions can lead to the increasing of VPDUs size.

In order to keep the VPDU size as 64×64 luma samples, the following normative partition restrictions (with syntax signaling modification) can be applied as shown in FIGS. 15A-15H: (i) the TT split is not allowed for a CU with either width or height, or both width and height equal to 128; (ii) for a 128×NCU with N≤64 (e.g., the width is equal to 128 and the height is smaller than 128), the horizontal BT split is not allowed; and (iii) for an N×128 CU with N≤64 (e.g., the height is equal to 128 and the width is smaller than 128), the vertical BT is not allowed.

According to aspects of the disclosure, in some hardware video encoders and decoders, processing throughput drops when a picture has more small intra blocks because of sample processing data dependency between neighboring intra blocks. The predictor generation of an intra block can require top and left boundary reconstructed samples from neighboring blocks. Therefore, intra prediction has to be sequentially processed block by block.

In some related examples such as HEVC, the smallest intra CU has a size of 8×8 of luma samples. The luma component of the smallest intra CU can be further split into four 4×4 luma intra PUs, but the chroma components of the smallest intra CU cannot be further split. Therefore, the worst case hardware processing throughput occurs when 4×4 chroma intra blocks or 4×4 luma intra blocks are processed. In some related examples such as VVC, in order to improve worst case throughput, chroma intra CBs with a size being smaller than 16 chroma samples (e.g., size is 2×2, 4×2, or 2×4) and chroma intra CBs with a width being smaller than 4 chroma samples (size is 2×N) are disallowed by constraining the partitioning of chroma intra CBs.

In a single coding tree, a smallest chroma intra prediction unit (SCIPU) can be defined as a coding tree node whose chroma block size is larger than or equal to 16 chroma samples and has at least one child luma block with a size of 64 luma samples, or a coding tree node whose chroma block size is not 2×N and has at least one child luma block with a size of 4×N luma samples. In each SCIPU, all CBs are inter, or all CBs are non-inter (i.e., either intra or intra block copy). In case of a non-inter SCIPU, chroma of the non-inter SCIPU cannot be further split and luma of the SCIPU can be allowed to be further split. In this way, the small chroma intra CBs with a size being less than 16 or equal to 2×N chroma samples are removed. In addition, chroma scaling is not applied in case of a non-inter SCIPU, and no additional syntax is signaled. Whether an SCIPU is non-inter can be derived by the prediction mode of the first luma CB in the SCIPU. The type of the SCIPU can be inferred to be non-inter if the current slice is an I-slice or the current SCIPU has a 4×4 luma partition in it after further split one time because no inter 4×4 can be allowed in VVC. Otherwise, the type of the SCIPU (inter or non-inter) can be indicated by one flag before parsing the CUs in the SCIPU.

For the dual tree in intra picture, the 2×N intra chroma blocks can be removed by disabling vertical binary and vertical ternary splits for 4×N and 8×N chroma partitions, respectively. The small chroma blocks with sizes of 2×2, 4×2, and 2×4 are also removed by partitioning restrictions.

In addition, a restriction on picture size can be considered to avoid 2×2/2×4/4×2/2×N intra chroma blocks at the corner of pictures by considering the picture width and height to be a multiple of max (e.g., 8, MinCbSizeY).

IV. Partitioning And Block Size Related Syntax in SPS

Table 3 shows exemplary SPS raw byte sequence payload (RBSP) syntax.

TABLE 3

| | Descriptor |
|---|---|
| seq_parameter_set_rbsp( ) { | |
| ... | |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   sps_log2_diff_min_qt_min_cb_inter_slice | ue(v) |
|   sps_max_mtt_hierarchy_depth_inter_slice | ue(v) |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) | |
| ... | |
| } | |

Table 4 shows exemplary picture header structure syntax.

TABLE 4

| | Descriptor |
|---|---|
| picture_header_structure( ) { | |
| ... | u(1) |
|   if( partition_constraints_override_enabled_flag ) | |
|     partition_constraints_override_flag | u(1) |
|   if( ph_intra_slice_allowed_flag ) { | |
|     if( partition_constraints_override_flag ) { | |
|       ph_log2_diff_min_qt_min_cb_intra_slice_luma | ue(v) |
|       ph_max_mtt_hierarchy_depth_intra_slice_luma | ue(v) |
|       if( ph_max_mtt_hierarchy_depth_intra_slice_luma != 0 ) { | |
|         ph_log2_diff_max_bt_min_qt_intra_slice_luma | ue(v) |
|         ph_log2_diff_max_tt_min_qt_intra_slice_luma | ue(v) |
|       } | |

TABLE 4-continued

| | Descriptor |
|---|---|
|       if( qtbtt_dual_tree_intra_flag ) { | |
|         ph_log2_diff_min_qt_min_cb_intra_slice_chroma | ue(v) |
|         ph_max_mtt_hierarchy_depth_intra_slice_chroma | ue(v) |
|         if( ph_max_mtt_hierarchy_depth_intra_slice_chroma != 0 ) { | |
|           ph_log2_diff_max_bt_min_qt_intra_slice_chroma | ue(v) |
|           ph_log2_diff_max_tt_min_qt_intra_slice_chroma | ue(v) |
|         } | |
|       } | |
|     } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
| } | |
| ... | |
| } | |

Table 5 shows exemplary coding tree unit syntax.

TABLE 5

| | Descriptor |
|---|---|
| coding_tree_unit( ) { | |
|   xCtb = CtbAddrX << CtbLog2SizeY | |
|   yCtb = CtbAddrY << CtbLog2SizeY | |
|   if( slice_sao_luma_flag \|\| slice_sao_chroma_flag ) | |
|     sao( CtbAddrX, CtbAddrY ) | |
|   if( slice_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { | |
|       if( slice_num_alf_aps_ids_luma > 0 ) | |
|         alf_use_aps_flag | ae(v) |
|       if( alf_use_aps_flag ) { | |
|         if( slice_num_alf_aps_ids_luma > 1 ) | |
|           alf_luma_prev_filter_idx | ae(v) |
|       } else | |
|         alf_luma_fixed_filter_idx | ae(v) |
|     } | |
|     if( slice_alf_chroma_idc = = 1 \|\| slice_alf_chroma_idc = = 3 ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |
|         alf_ctb_filter_alt_idx[ 0 ][ CtbAddrX ][ CtbAddrY ] | ae(v) |
|     } | |
|     if( slice_alf_chroma_idc = = 2 \|\| slice_alf_chroma_idc = = 3 ) { | |
|       alf_ctb_flag[ 2 ][ CtbAddrX ][ CtbAddrY ] | ae(v) |
|       if( alf_ctb_flag[ 2 ][ CtbAddrX ][ CtbAddrY ] | |
|         && alf_chroma_num_alt_filters_minus1 > 0 ) | |
|         alf_ctb_filter_alt_idx[ 1 ][ CtbAddrX ][ CtbAddrY ] | ae(v) |
|     } | |
|   } | |
|   if( slice_cc_alf_cb_enabled_flag ) | |
|     alf_ctb_cc_cb_idc[ CtbAddrX ][ CtbAddrY ] | ae(v) |
|   if( slice_cc_alf_cr_enabled_flag ) | |
|     alf_ctb_cc_cr_idc[ CtbAddrX ][ CtbAddrY ] | ae(v) |
|   if( slice_type = = I && qtbtt_dual_tree_intra_flag ) | |
|     dual_tree_implicit_qt_split( xCtb, yCtb, CtbSizeY, 0 ) | |
|   else | |
|     coding_tree( xCtb, yCtb, CtbSizeY, CtbSizeY, 1, 1, 0, 0, 0, 0, | |
|         SINGLE_TREE, MODE_TYPE_ALL ) | |
| } | |

Table 6 shows exemplary dual tree implicit QT split syntax.

TABLE 6

|  | Descriptor |
|---|---|
| ```
dual_tree_implicit_qt_split( x0, y0, cbSize, cqtDepth ) {
  cbSubdiv = 2 * cqtDepth
  if( cbSize > 64 ) {
    if( cu_qp_delta_enabled_flag && cbSubdiv <= CuQpDeltaSubdiv ) {
      IsCuQpDeltaCoded = 0
      CuQpDeltaVal = 0
      CuQgTopLeftX = x0
      CuQgTopLeftY = y0
    }
    if( cu_chroma_qp_offset_enabled_flag && cbSubdiv <= CuChromaQpOffsetSubdiv ) {
      IsCuChromaQpOffsetCoded = 0
      CuQpOffsetCb = 0
      CuQpOffsetCb = 0
      CuQpOffsetCbCr = 0
    }
    x1 = x0 + ( cbSize / 2 )
    y1 = y0 + ( cbSize / 2 )
    dual_tree_implicit_qt_split( x0, y0, cbSize / 2, cqtDepth + 1 )
    if( x1 < pic_width_in_luma_samples )
      dual_tree_implicit_qt_split( x1, y0, cbSize / 2, cqtDepth + 1 )
    if( y1 < pic_height_in_luma_samples )
      dual_tree_implicit_qt_split( x0, y1, cbSize / 2, cqtDepth + 1 )
    if( x1 < pic_width_in_luma_samples && y1 < pic_height_in_luma_samples )
      dual_tree_implicit_qt_split( x1, y1, cbSize / 2, cqtDepth + 1 )
  } else {
    coding_tree( x0, y0, cbSize, cbSize, 1, 0, cbSubdiv, cqtDepth, 0, 0, 0,
        DUAL_TREE_LUMA, MODE_TYPE_ALL )
    coding_tree( x0, y0, cbSize, cbSize, 0, 1, cbSubdiv, cqtDepth, 0, 0, 0,
        DUAL_TREE_CHROMA, MODE_TYPE_ALL )
  }
}
``` | |

Table 7 shows exemplary coding tree syntax.

TABLE 7

|  | Descriptor |
|---|---|
| ```
coding_tree( x0, y0, cbWidth, cbHeight, qgOnY, qgOnC, cbSubdiv, cqtDepth, mttDepth, depthOffset,
        partIdx, treeTypeCurr, modeTypeCurr ) {
  if( (allowSplitBtVer || allowSplitBtHor || allowSplitTtVer || allowSplitTtHor ||
        allowSplitQT ) && ( x0 + cbWidth <= pic_width_in_luma_samples ) &&
        ( y0 + cbHeight <= pic_height_in_luma_samples ) )
    split_cu_flag
``` | ae(v) |
| ```
  if( cu_qp_delta_enabled_flag && qgOnY && cbSubdiv <= CuQpDeltaSubdiv ) {
    IsCuQpDeltaCoded = 0
    CuQpDeltaVal = 0
    CuQgTopLeftX = x0
    CuQgTopLeftY = y0
  }
  if( cu_chroma_qp_offset_enabled_flag && qgOnC &&
        cbSubdiv <= CuChromaQpOffsetSubdiv ) {
    IsCuChromaQpOffsetCoded = 0
    CuQpOffsetCb =0
    CuQpOffsetCb = 0
    CuQpOffsetCbCr = 0
  }
  if( split_cu_flag ) {
    if( ( allowSplitBtVer || allowSplitBtHor || allowSplitTtVer || allowSplitTtHor ) &&
        allowSplitQT )
      split_qt_flag
``` | ae(v) |
| ```
    if( ! split_qt_flag ) {
      if( ( allowSplitBtHor || allowSplitTtHor ) && ( allowSplitBtVer || allowSplitTtVer ) )
        mtt_split_cu_vertical_flag
``` | ae(v) |
| ```
      if( ( allowSplitBtVer && allowSplitTtVer && mtt_split_cu_vertical_flag ) ||
          ( allowSplitBtHor && allowSplitTtHor && !mtt_split_cu_vertical_flag ) )
        mtt_split_cu_binary_flag
    }
``` | ae(v) |

TABLE 7-continued

| | Descriptor |
|---|---|
| ```
    if( modeTypeCondition = = 1 )
      modeType = MODE_TYPE_INTRA
    else if( modeTypeCondition = = 2 ) {
      mode_constraint_flag
      modeType = mode_constraint_flag ? MODE_TYPE_INTRA : MODE_TYPE_INTER
    } else
      modeType = modeTypeCurr
    treeType = ( modeType = = MODE_TYPE_INTRA ) ? DUAL_TREE_LUMA : treeTypeCurr
    if( !split_qt flag ) {
      if( MttSplitMode[ x0 ][ y0 ][ mttDepth ] = = SPLIT_BT_VER ) {
        depthOffset += ( x0 + cbWidth > pic_width_in_luma_samples ) ? 1 : 0
        x1 = x0 + ( cbWidth / 2 )
        coding_tree( x0, y0, cbWidth / 2, cbHeight, qgOnY, qgOnC, cbSubdiv + 1,
          cqtDepth, mttDepth + 1, depthOffset, 0, treeType, modeType )
        if( x1 < pic_width_in_luma_samples )
          coding_tree( x1, y0, cbWidth / 2, cbHeightY, qgOnY, qgOnC, cbSubdiv + 1,
            cqtDepth, mttDepth + 1, depthOffset, 1, treeType, modeType )
      } else if( MttSplitMode[ x0 ][ y0 ][ mttDepth ] = = SPLIT_BT_HOR ) {
        depthOffset += ( y0 + cbHeight > pic_height_in_luma_samples ) ? 1 : 0
        y1 = y0 + (cbHeight / 2 )
        coding_tree( x0, y0, cbWidth, cbHeight / 2, qgOnY, qgOnC, cbSubdiv + 1,
          cqtDepth, mttDepth + 1, depthOffset, 0, treeType, modeType )
        if( y1 < pic_height_in_luma_samples )
          coding_tree( x0, y1, cbWidth, cbHeight / 2, qgOnY, qgOnC, cbSubdiv + 1,
            cqtDepth, mttDepth + 1, depthOffset, 1, treeType, modeType )
      } else if( MttSplitMode[ x0 ][ y0 ][ mttDepth ] = = SPLIT_TT_VER ) {
        x1 = x0 + ( cbWidth / 4 )
        x2 = x0 + ( 3 * cbWidth / 4 )
        qgNextOnY = qgOnY && ( cbSubdiv + 2 <= CuQpDeltaSubdiv )
        qgNextOnC = qgOnC && ( cbSubdiv + 2 <= CuChromaQpOffsetSubdiv )
        coding_tree( x0, y0, cbWidth / 4, cbHeight, qgNextOnY, qgNextOnC, cbSubdiv + 2,
          cqtDepth, mttDepth + 1, depthOffset, 0, treeType, modeType )
        coding_tree( x1, y0, cbWidth / 2, cbHeight, qgNextOnY, qgNextOnC, cbSubdiv + 1,
          cqtDepth, mttDepth + 1, depthOffset, 1, treeType, modeType)
        coding_tree( x2, y0, cbWidth / 4, cbHeight, qgNextOnY, qgNextOnC, cbSubdiv + 2,
          cqtDepth, mttDepth + 1, depthOffset, 2, treeType, modeType )
      } else { /* SPLIT_TT_HOR */
        y1 = y0 + ( cbHeight / 4 )
        y2 = y0 + ( 3 * cbHeight / 4 )
        qgNextOnY = qgOnY && ( cbSubdiv + 2 <= CuQpDeltaSubdiv )
        qgNextOnC = qgOnC && ( cbSubdiv + 2 <= CuChromaQpOffsetSubdiv )
        coding_tree( x0, y0, cbWidth, cbHeight / 4, qgNextOnY, qgNextOnC, cbSubdiv + 2,
          cqtDepth, mttDepth + 1, depthOffset, 0, treeType, modeType )
        coding_tree( x0, y1, cbWidth, cbHeight / 2, qgNextOnY, qgNextOnC, cbSubdiv + 1,
          cqtDepth, mttDepth + 1, depthOffset, 1, treeType, modeType )
        coding_tree( x0, y2, cbWidth, cbHeight / 4, qgNextOnY, qgNextOnC, cbSubdiv + 2,
          cqtDepth, mttDepth + 1, depthOffset, 2, treeType, modeType )
      }
    } else {
      x1 = x0 + (cbWidth / 2 )
      y1 = y0 + ( cbHeight / 2 )
      coding_tree( x0, y0, cbWidth / 2, cbHeight / 2, qgOnY, qgOnC, cbSubdiv + 2,
        cqtDepth + 1, 0, 0, 0, treeType, modeType )
      if( x1 < pic_width_in_luma_samples )
        coding_tree( x1, y0, cbWidth / 2, cbHeight / 2, qgOnY, qgOnC, cbSubdiv + 2,
          cqtDepth + 1, 0, 0, 1, treeType, modeType )
      if( y1 < pic_height_in_luma_samples )
        coding_tree( x0, y1, cbWidth / 2, cbHeight / 2, qgOnY, qgOnC, cbSubdiv + 2,
          cqtDepth + 1, 0,0,2, treeType, modeType )
      if( y1 < pic_height_in_luma_samples && x1 < pic_width_in_luma_samples )
        coding_tree( x1, y1, cbWidth / 2, cbHeight / 2, qgOnY, qgOnC, cbSubdiv + 2,
          cqtDepth + 1, 0,0, 3, treeType, modeType )
    }
    if( modeTypeCur = = MODE_TYPE_ALL && modeType = = MODE_TYPE_INTRA )
      coding_tree( x0, y0, cbWidth, cbHeight, 0, qgOnC, cbSubdiv, cqtDepth, mttDepth, 0, 0
        DUAL_TREE_CHROMA, modeType )
  } else
    coding_unit( x0, y0, cbWidth, cbHeight, cqtDepth, treeTypeCurr, modeTypeCurr )
}
``` | ae(v) |

V. Partitioning and Block Size Related Semantics

When the variable qtbtt_dual_tree_intra_flag is equal to 1, it specifies that, for I slices, each CTU can be split into coding units with 64×64 luma samples using an implicit quadtree split, and these coding units can be the root of two separate coding tree syntax structures for luma and chroma. When the variable qtbtt_dual_tree_intra_flag is equal to 0, it specifies that the separate coding tree syntax structure is not used for I slices. When the variable qtbtt_dual_tree_intra_flag is not present, it is inferred to be equal to 0.

The variable log2_min_luma_coding_block_size_minus2 plus 2 specifies the minimum luma coding block size. The value range of log2_min_luma_coding_block_size_minus2 can be in the range of 0 to Min (4, sps_log2_ctu_ size_minus5+3), inclusive.

The variables MinCbLog2SizeY, MinCbSizeY, IbcBufWidthY, IbcBufWidthC and Vsize can be derived as follows:

$$MinCbLog2SizeY = \\ \text{log2\_min\_luma\_coding\_block\_size\_minus2} + 2 \quad \text{(Eq. 1)}$$

$$MinCbSizeY = 1 \ll MinCbLog2SizeY \quad \text{(Eq. 2)}$$

$$IbcBufWidthY = 256 * 128/CtbSizeY \quad \text{(Eq. 3)}$$

$$IbcBufWidthC = IbcBufWidthY/SubWidthC \quad \text{(Eq. 4)}$$

$$VSize = \text{Min}(64, CtbSizeY) \quad \text{(Eq. 5)}$$

The value of MinCbSizeY can be less than or equal to VSize.

The variables CtbWidthC and CtbHeightC, which specify the width and height, respectively, of the array for each chroma CTB, can be derived as follows. If chroma_format_idc is equal to 0 (monochrome) or separate_colour_plane_flag is equal to 1, CtbWidthC and CtbHeightC are both equal to 0. Otherwise, CtbWidthC and CtbHeightC are derived as follows:

$$CtbWidthC = CtbSizeY/SubWidthC \quad \text{(Eq. 6)}$$

$$CtbHeightC = CtbSizeY/SubHeightC \quad \text{(Eq. 7)}$$

For log2BlockWidth ranging from 0 to 4 and for log2BlockHeight ranging from 0 to 4, inclusive, the up-right diagonal scan order array initialization process can be invoked with 1<<log2BlockWidth and 1<<log2BlockHeight as inputs, and the output is assigned to DiagScanOrder[log2BlockWidth][log2BlockHeight].

For log2BlockWidth ranging from 0 to 6 and for log2BlockHeight ranging from 0 to 6, inclusive, the horizontal and vertical traverse scan order array initialization process can be invoked with 1<<log2BlockWidth and 1<<log2BlockHeight as inputs, and the output is assigned to HorTravScanOrder[log2BlockWidth][log2BlockHeight] and VerTravScanOrder[log2BlockWidth][log2BlockHeight].

When the variable partition_constraints_override_enabled_flag is equal to 1, it specifies the presence of partition_constraints_override_flag in PHs referring to the SPS. When the variable partition_constraints_override_enabled_flag is equal to 0, it specifies the absence of partition_constraints_override_flag in PHs referring to the SPS.

The variable sps_log2_diff_min_qt_min_cb_intra_ slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type being equal to 2 (e.g., I) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_intra_slice_luma can be in the range of 0 to CtbLog2SizeY−MinCbLog2SizeY, inclusive. The base 2 logarithm of the minimum size in luma samples of a luma leaf block resulting from quadtree splitting of a CTU can be derived as follows:

$$MinQtLog2SizeIntraY = \\ \text{sps\_log2\_diff\_min\_qt\_min\_cb\_intra\_slice\_luma} + \\ MinCbLog2SizeY \quad \text{(Eq. 8)}$$

The variable sps_max_mtt_hierarchy_depth_intra_slice_luma specifies the default maximum hierarchy depth for coding units resulting from multi-type tree splitting of a quadtree leaf in slices with slice_type being equal to 2 (e.g., I) referring to the SPS. When partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma can be in the range of 0 to 2*(CtbLog2SizeY−MinCbLog2SizeY), inclusive.

The variable sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type being equal to 2 (e.g., I) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_intra_slice_luma can be in the range of 0 to CtbLog2SizeY−MinQtLog2SizeIntraY, inclusive. When sps_log2_diff_max_bt_min_qt_intra_ slice_ luma is not present, the value of sps_log2_ diff_max_bt_min_qt_intra_slice_luma can be inferred to be equal to 0.

The variable sps_log2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type being equal to 2 (e.g., I) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_intra_slice_luma can be in the range of 0 to CtbLog2SizeY−MinQtLog2SizeIntraY, inclusive. When sps_log2_diff_max_tt_min_qt_intra_slice_luma is not present, the value of sps_log2_diff_max_tt_min_qt_intra_slice_luma can be inferred to be equal to 0.

The variable sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type being equal to 0 (i. e., B) or 1 (i.e., P) referring to the SPS. When partition constraints override enabled flag is equal to 1, the default difference can be overridden by ph_log2_diff_min_qt_min_cb_luma present in PHs referring to the SPS. The value of sps_log2_diff_min_qt_min_cb_inter_slice can be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$$MinQtLog2SizeInterY = \\ sps\_log2\_diff\_min\_qt\_min\_cb\_intra\_slice + MinCbLog2SizeY \quad \text{(Eq. 9)}$$

The variable sps_max_mtt_hierarchy_depth_inter_slice specifies the default maximum hierarchy depth for coding units resulting from multi-type tree splitting of a quadtree leaf in slices with slice_type being equal to 0 (B) or 1 (P) referring to the SPS. When partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice can be in the range of 0 to 2*(CtbLog2SizeY−MinCbLog2SizeY), inclusive.

The variable sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type being equal to 0 (B) or 1 (P) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_inter_slice can be in the range of 0 to CtbLog2SizeY−MinQtLog2SizeInterY, inclusive. When sps_log2_diff_max_bt_min_qt_inter_slice is not present, the value of sps_log2_diff_max_bt_min_qt_inter_slice is inferred to be equal to 0.

The variable sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type being equal to 0 (B) or 1 (P) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_inter_slice can be in the range of 0 to CtbLog2SizeY−MinQtLog2SizeInterY, inclusive. When sps_log2_diff_max_tt_min_qt_inter_slice is not present, the value of sps_log2_diff_max_tt_min_qt_inter_slice is inferred to be equal to 0.

The variable sps_log2_diff_min_qt_min_cb_intra_slice chroma specifies the default difference between the base 2 logarithm of the minimum size in luma samples of a chroma leaf block resulting from quadtree splitting of a chroma CTU with treeType being equal to DUAL_TREE_CHROMA and the base 2 logarithm of the minimum coding block size in luma samples for chroma CUs with treeType being equal to DUAL_TREE_CHROMA in slices with slice_type being equal to 2 (I) referring to the SPS. When partition_constraints_override_enabled_flag is equal to 1, the default difference can be overridden by ph_log2_diff_min_qt_min_cb_chroma present in PHs referring to the SPS. The value of sps_log2_diff_min_qt_min_cb_intra_slice chroma can be in the range of 0 to CtbLog2SizeY−MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType being equal to DUAL_TREE_CHROMA can be derived as follows:

$$MinQtLog2SizeIntraC = \\ sps\_log2\_diff\_min\_qt\_min\_cb\_intra\_slice\_chroma + \\ MinCbLog2SizeY \quad \text{(Eq. 10)}$$

The variable sps_max_mtt_hierarchy_depth_intra_slice chroma specifies the default maximum hierarchy depth for chroma coding units resulting from multi-type tree splitting of a chroma quadtree leaf with treeType being equal to DUAL TREE CHROMA in slices with slice_type being equal to 2 (I) referring to the SPS. When partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma can be in the range of 0 to 2*(CtbLog2SizeY−MinCbLog2SizeY), inclusive. When not present, the value of sps_max_mtt_hierarchy_depth_intra_slice_chroma is inferred to be equal to 0.

The variable sps_log2_diff_max_bt_min_qt_intra_slice chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType being equal to DUAL_TREE_CHROMA in slices with slice_type being equal to 2 (I) referring to the SPS. When partition_constraints_override_enabled_flag is equal to 1, the default difference can be overridden by ph_log2_diff_max_bt_min_qt_chroma present in PHs referring to the SPS. The value of sps_log2_diff_max_bt_min_qt_intra_slice_chroma can be in the range of 0 to CtbLog2SizeY−MinQtLog2SizeIntraC, inclusive. When sps_log2_diff_max_bt_min_qt_intra_slice_chroma is not present, the value of sps_log2_diffmax_bt_min_qt_intra_slice_chroma is inferred to be equal to 0.

The variable sps_log_dif_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType being equal to DUAL_TREE_CHROMA in slices with slice_type being equal to 2 (I) referring to the SPS. When partition_constraints_override_enabled_flag is equal to 1, the default difference can be overridden by ph_log2_diff_max_tt_min_qt_chroma present in PHs referring to the SPS. The value of sps_log2_diff_max_tt_min_qt_intra_slice_chroma can be in the range of 0 to CtbLog2SizeY−MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.

When the variable sps_max_luma_transform_size_64_lag is equal to 1, it specifies that the maximum transform size in luma samples is equal to 64. When the variable sps_max_luma_transform_size_64_flag is equal to 0, it specifies that the maximum transform size in luma samples is equal to 32.

When CtbSizeY is less than 64, the value of sps_max_luma_transform_size_64_flag can be equal to 0.

The variables MinTbLog2SizeY, MaxTbLog2SizeY, MinTbSizeY, and MaxTbSizeY can be derived as follows:

$$MinTbLog2SizeY = 2 \quad \text{(Eq. 11)}$$

$$MaxTbLog2SizeY = \text{sps\_max\_luma\_transform\_size\_64\_flag} ? 6:5 \quad \text{(Eq. 12)}$$

$$MinTbSizeY = 1 \ll MinTbLog2SizeY \quad \text{(Eq. 13)}$$

$$MaxTbSizeY = 1 \ll MaxTbLog2SizeY \quad \text{(Eq. 14)}$$

The variable ph_log2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type being equal to 2 (I) associated with the PH. The value of ph_log2_diff_min_qt_min_cb_intra_slice_luma can be in the range of 0 to CtbLog2SizeY−MinCbLog2SizeY, inclusive. When not present, the value of ph_log2_diff_min_qt_min_cb_luma is inferred to be equal to sps_log2_diff_min_qt_ min_cb_intra_slice_luma.

The variable ph_max_mtt_hierarchy_depth_intra_slice_luma specifies the maximum hierarchy depth for coding units resulting from multi-type tree splitting of a quadtree leaf in slices with slice_type being equal to 2 (I) associated with the PH. The value of ph_max_mtt_hierarchy_depth_intra_slice_luma can be in the range of 0 to 2*(CtbLog2SizeY−MinCbLog2SizeY), inclusive. When not present, the value of ph_max_mtt_hierarchy_depth_intra_slice_luma is inferred to be equal to sps_max_mtt_hierarchy_depth_intra_slice_luma.

The variable ph_log2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type being equal to 2 (I) associated with the PH. The value of ph_log2_diff_max_bt_min_qt_intra_slice_luma can be in the range of 0 to CtbLog2SizeY−MinQtLog2SizeIntraY, inclusive. When not present, the value of ph_log2_diff_max_bt_min_qt_intra_slice_luma is inferred to be equal to sps_log2_diff_max_bt_ min_qt_intra_slice_luma.

The variable ph_log2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type being equal to 2 (I) associated with the PH. The value of ph_log2_diff_max_tt_min_qt_intra_slice_luma can be in the range of 0 to CtbLog2SizeY−MinQtLog2SizeIntraY, inclusive. When not present, the value of ph_log2_diff_max_tt_min_qt_intra_slice_luma is inferred to be equal to sps_log2_diff_max_tt_min_qt_intra_slice_luma.

The variable ph_log2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to being 2 (I) associated with the PH. The value of ph_log2_diff_min_qt_min_cb_intra_slice_chroma can be in the range of 0 to CtbLog2SizeY−MinCbLog2SizeY, inclusive. When not present, the value of ph_log2_diff_min_qt_min_cb_intra_slice_chroma is inferred to be equal to sps_log2_diff_min_qt_min_cb_intra_slice_chroma.

The variable ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to being 2 (I) associated with the PH. The value of ph_max_mtt_hierarchy_depth_intra_slice_chroma can be in the range of 0 to 2*(CtbLog2SizeY−MinCbLog2SizeY), inclusive. When not present, the value of ph_max_mtt_hierarchy_depth_intra_slice_chroma is inferred to be equal to sps_max_mtt_hierarchy_depth_intra_slice_chroma.

The variable ph_log2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log2_diff_max_bt_min_qt_intra_slice_chroma can be in the range of 0 to CtbLog2SizeY−MinQtLog2SizeIntraC, inclusive. When not present, the value of ph_log2_diff_max_bt_min_qt_intra_slice_chroma is inferred to be equal to sps_log2_diff_max_bt_min_qt_intra_ slice_chroma.

The variable ph_log2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type being equal to 2 (I) associated with the PH. The value of ph_log2_diff_max_tt_min_qt_intra_slice_chroma can be in the range of 0 to CtbLog2SizeY−MinQtLog2SizeIntraC, inclusive. When not present, the value of ph_log2_diff_max_tt_min_qt_intra_slice_chroma is inferred to be equal to sps_log2_diff_max_tt_min_qt_intra_slice_chroma.

The variable slice_type specifies the coding type of the slice according to Table 8.

TABLE 8

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type can be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type can be equal to 2.

The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows. If slice_type is equal to 2 (I), the following applies:

$MinQtLog2SizeY = MinCbLog2SizeY +$ (Eq. 15)
ph_log2_diff_min_qt_min_cb_intra_slice_luma $MinQtLog2SizeC = MinCbLog2SizeY +$ (Eq. 16)
ph_log2_diff_min_qt_min_cb_intra_slice_chroma $MaxBtSizeY = 1 \ll (MinQtLog2SizeY +$ (Eq. 17)
ph_log2_diff_max_bt_min_qt_intra_slice_luma)

$MaxBtSizeC = 1 \ll (MinQtLog2SizeC +$ (Eq. 18)
ph_log2_diff_max_bt_min_qt_intra_slice_chroma)

$MaxTtSizeY = 1 \ll (MinQtLog2SizeY +$ (Eq. 19)
ph_log2_diff_max_tt_min_qt_intra_slice_luma)

$MaxTtSizeC = 1 \ll (MinQtLog2SizeC +$ (Eq. 20)
ph_log2_diff_max_tt_min_qt_intra_slice_chroma)

$MaxMttDepthY =$ ph_max_mtt_hierarchy_depth_intra_slice_luma (Eq. 21)

$MaxMttDepthC =$ (Eq. 22)
ph_max_mtt_hierarchy_depth_intra_slice_chroma $CuQpDeltaSubdiv =$ ph_cu_qp_delta_subdiv_intra_slice (Eq. 23)

$CuChromaQpOffsetSubdiv =$ (Eq. 24)
ph_cu_chroma_qp_offset_subdiv_intra_slice

Otherwise, when slice_type is equal to 0 (B) or 1 (P)), the following applies:

$MinQtLog2SizeY =$ (Eq. 25)
MinCbLog2SizeY + ph_log2_diff_min_qt_min_cb_inter_slice $MinQtLog2SizeC =$ (Eq. 26)
MinCbLog2SizeY + ph_log2_diff_min_qt_min_cb_inter_slice $MaxBtSizeY = 1 \ll$ (Eq. 27)
(MinQtLog2SizeY + ph_log2_diff_max_bt_min_qt_inter_slice)

$MaxBtSizeC = 1 \ll$ (Eq. 28)
(MinQtLog2SizeC + ph_log2_diff_max_bt_min_qt_inter_slice)

$MaxTtSizeY = 1 \ll$ (Eq. 29)
(MinQtLog2SizeY + ph_log2_diff_max_tt_min_qt_inter_slice)

$MaxTtSizeC = 1 \ll$ (Eq. 30)
(MinQtLog2SizeC + ph_log2_diff_max_tt_min_qt_inter_slice)

$MaxMttDepthY =$ ph_max_mtt_hierarchy_depth_inter_slice (Eq. 31)

$MaxMttDepthC =$ ph_max_mtt_hierarchy_depth_inter_slice (Eq. 32)

$CuQpDeltaSubdiv =$ ph_cu_qp_delta_subdiv_inter_slice (Eq. 33)

$CuChromaQpOffsetSubdiv =$ (Eq. 34)
ph_cu_chroma_qp_offset_subdiv_inter_slice

Then, the following applies:

$MinQtSizeY = 1 \ll MinQtLog2SizeY$ (Eq. 35)

$MinQtSizeC = 1 \ll MinQtLog2SizeC$ (Eq. 36)

$MinBtSizeY = 1 \ll MinCbLog2SizeY$ (Eq. 37)

$MinTtSizeY = 1 \ll MinCbLog2SizeY$ (Eq. 38)

The variables allowSplitQt, allowSplitBtVer, allowSplitBtHor, allowSplitTtVer, and allowSplitTtHor are derived as follows. The allowed quad split process can be invoked with the coding block size cbSize set equal to cbWidth, the current multi-type tree depth mttDepth, treeTypeCurr, and modeTypeCurr as inputs, and the output is assigned to allowSplitQt.

The variables minQtSize, maxBtSize, maxTtSize and maxMttDepth can be derived as follows. If treeType is equal to DUAL TREE CHROMA, then minQtSize, maxBtSize, maxTtSize, and maxMttDepth are set equal to MinQtSizeC, MaxBtSizeC, MaxTtSizeC, and MaxMttDepthC+depthOffset, respectively.

Otherwise, minQtSize, maxBtSize, maxTtSize, and maxMttDepth are set equal to MinQtSizeY, MaxBtSizeY, MaxTtSizeY, and MaxMttDepthY+depthOffset, respectively.

The allowed binary split process can be invoked with the binary split mode SPLIT_BT_VER, the coding block width cbWidth, the coding block height cbHeight, the location (x0, y0), the current multi-type tree depth mttDepth, the maximum multi-type tree depth with offset maxMttDepth, the maximum binary tree size maxBtSize, the minimum quadtree size minQtSize, the current partition index partIdx, treeTypeCurr, and modeTypeCurr as inputs, and the output is assigned to allowSplitBtVer.

The allowed binary split process can be invoked with the binary split mode SPLIT_BT_HOR, the coding block height cbHeight, the coding block width cbWidth, the location (x0, y0), the current multi-type tree depth mttDepth, the maximum multi-type tree depth with offset maxMttDepth, the maximum binary tree size maxBtSize, the minimum quadtree size minQtSize, the current partition index partIdx, treeTypeCurr, and modeTypeCurr as inputs, and the output is assigned to allowSplitBtHor.

The allowed ternary split process can be invoked with the ternary split mode SPLIT_TT_VER, the coding block width cbWidth, the coding block height cbHeight, the location (x0, y0), the current multi-type tree depth mttDepth, the maximum multi-type tree depth with offset maxMttDepth, the maximum ternary tree size maxTtSize, treeTypeCurr, and modeTypeCurr as inputs, and the output is assigned to allowSplitTtVer.

The allowed ternary split process can be invoked with the ternary split mode SPLIT_TT_HOR, the coding block height cbHeight, the coding block width cbWidth, the location (x0, y0), the current multi-type tree depth mttDepth, the maximum multi-type tree depth with offset maxMttDepth, the maximum ternary tree size maxTtSize, treeTypeCurr, and modeTypeCurr as inputs, and the output is assigned to allowSplitTtHor.

When the variable split_cu_flag is equal to 0, it specifies that a coding unit is not split. When the variable split_cu_flag is equal to 1, it specifies that a coding unit is split into four coding units using a quad split as indicated by the syntax element split_qt_flag, or into two coding units using a binary split or into three coding units using a ternary split as indicated by the syntax element mtt_split_cu_binary_flag. The binary or ternary split can be either vertical or horizontal as indicated by the syntax element mtt_split_cu_vertical_flag.

When split_cu_flag is not present, the value of split_cu_flag is inferred as follows. If one or more of the following conditions are true, the value of split_cu_flag is inferred to be equal to 1: (i) x0 30 cbWidth is greater than pic width in luma samples; and (ii) y0+cbHeight is greater than pic_height_in_luma_samples. Otherwise, the value of split_cu_flag is inferred to be equal to 0.

The variable split_qt_flag specifies whether a coding unit is split into coding units with half horizontal and vertical size. When split_qt_flag is not present, the following applies. If all of the following conditions are true, split_qt_flag is inferred to be equal to 1: (i) split_cu_flag is equal to 1; and (ii) allowSplitQt, allowSplitBtHor, allowSplitBtVer, allowSplitTtHor, and allowSplitTtVer are equal to FALSE. Otherwise, if allowSplitQt is equal to TRUE, the value of split_qt_flag is inferred to be equal to 1. Otherwise, the value of split_qt_flag is inferred to be equal to 0.

When the variable mtt_split_cu_vertical_flag is equal to 0, it specifies that a coding unit is split horizontally. When the variable mtt_split_cu_vertical_flag is equal to 1, it specifies that a coding unit is split vertically. When the variable mtt_split_cu_vertical_flag is not present, it can be inferred as follows. If allowSplitBtHor is equal to TRUE or allowSplitTtHor is equal to TRUE, the value of mtt_split_cu_vertical_flag is inferred to be equal to 0. Otherwise, the value of mtt_split_cu_vertical_flag is inferred to be equal to 1.

When the variable mtt_split_cu_binary_flag is equal to 0, it specifies that a coding unit is split into three coding units using a ternary split. When the variable mtt_split_cu_binary_flag is equal to 1, it specifies that a coding unit is split into two coding units using a binary split. When the variable mtt_split_cu_binary_flag is not present, it can be inferred as follows. If allowSplitBtVer is equal to FALSE and allowSplitBtHor is equal to FALSE, the value of mtt_split_cu_binary_flag is inferred to be equal to 0. Otherwise, if allowSplitTtVer is equal to FALSE and allowSplitTtHor is equal to FALSE, the value of mtt_split_cu_binary_flag is inferred as to be equal to 1. Otherwise, if allowSplitBtHor is equal to TRUE and allowSplitTtVer is equal to TRUE, the value of mtt_split_cu_binary_flag is inferred to be equal to 1−mtt_split_cu_vertical_flag. Otherwise, if allowSplitBtVer is equal to TRUE and allowSplitTtHor is equal to TRUE, the value of mtt_split_cu_binary_flag is inferred to be equal to mtt_split_cu_vertical_flag.

The variable MttSplitMode[x][y][mttDepth] can be derived from the value of mtt_split_cu_vertical_flag and from the value of mtt_split_cu_binary_flag as defined in Table 9 for x=x0 . . . x0+cbWidth−1 and y=y0 . . . y0+cbHeight−1.

TABLE 9

| MttSplitMode[ x0 ][ y0 ][ mttDepth ] | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

MttSplitMode[x0][y0][mttDepth] represents horizontal and vertical binary and ternary splittings of a coding unit within the multi-type tree as illustrated in FIGS. 16A-16D. The array indices x0, y0 specify the location (x0, y0) of the top-left luma sample of the considered coding block relative to the top-left luma sample of the picture.

The variable modeTypeCondition can be derived as follows. If one or more of the following conditions are true, modeTypeCondition is set equal to 0: (i) slice_type is equal to I and qtbtt_dual_tree_intra_flag is equal to 1; (ii) modeTypeCurr is not equal to MODE_TYPE_ALL; (iii) chroma_format_idc is equal to 0; and (iv) chroma_format_idc is equal to 3. Otherwise, if one of the following conditions is true, modeTypeCondition is set equal to 1: (i) cbWidth*cbHeight is equal to 64 and split_qt_flag is equal to 1; (ii) cbWidth*cbHeight is equal to 64 and MttSplitMode[x0][y0][mttDepth] is equal to SPLIT_TT_HOR or SPLIT_TT_VER; (iii) cbWidth*cbHeight is equal to 32 and MttSplitMode[x0][y0][mttDepth] is equal to SPLIT_BT_HOR or SPLIT_BT_VER. Otherwise, if one of the following conditions is true, modeTypeCondition is set equal to 1+(slice_type!=I? 1:0): (i) cbWidth*cbHeight is equal to 64 and MttSplitMode[x0][y0][mttDepth] is equal to SPLIT_BT_HOR or SPLIT_BT_VER and chroma_format_idc is equal to 1; (ii) cbWidth*cbHeight is equal to 128 and MttSplitMode[x0][y0][mttDepth] is equal to SPLIT_TT_HOR or SPLIT_TT_VER and chroma_format_idc is equal to 1; (iii) cbWidth is equal to 8 and MttSplitMode[x0][y0][mttDepth] is equal to SPLIT_BT_VER; and (iv) cbWidth is equal to 16 and MttSplitMode[x0][y0][mttDepth] is equal to SPLIT_TT_VER. Otherwise, modeTypeCondition is set equal to 0.

When the variable mode_constraint_flag is equal to 0, it specifies that coding units inside the current coding tree node can only use inter prediction coding modes. When the variable mode_constraint_flag is equal to 1, it specifies that coding units inside the current coding tree node cannot use inter prediction coding modes.

VI. Partitioning Availability Processes

According to aspects of the disclosure, an allowed quad split process can be described as follows. Inputs to this process include a coding block size cbSize in luma samples, a multi-type tree depth mttDepth, a variable treeType, and a variable modeType. The variable treeType specifies whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed. The variable modeType specifies whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node. Output of this process is the variable allowQtSplit.

The variable allowQtSplit can be derived as follows. If one or more of the following conditions are true, allowQtSplit is set equal to FALSE: (i) treeType is equal to SINGLE_ TREE or DUAL_TREE_LUMA and cbSize is less than or equal to MinQtSizeY; (ii) treeType is equal to DUAL_TREE_CHROMA and cbSize is less than or equal to (MinQtSizeC*SubHeightC/SubWidthC); (iii) mttDepth is not equal to 0; (iv) treeType is equal to DUAL_TREE_CHROMA and (cbSize/SubWidthC) is less than or equal to 4; and (v) treeType is equal to DUAL_TREE_CHROMA and modeType is equal to MODE_TYPE_INTRA. Otherwise, allowQtSplit is set equal to TRUE.

According to aspects of the disclosure, an allowed binary split process can be described as follows. Inputs to this process include a binary split mode btSplit, a coding block width cbWidth in luma samples, a coding block height cbHeight in luma samples, a location (x0, y0) of the top-left luma sample of the considered coding block relative to the top-left luma sample of the picture, a multi-type tree depth mttDepth, a maximum multi-type tree depth with offset maxMttDepth, a maximum binary tree size maxBtSize, a minimum quadtree size minQtSize, a partition index partIdx, a variable treeType, and a variable modeType. The variable treeType specifies whether a single tree (SINGLE_TREE) or a dual tree is used to partition the coding tree node and, when a dual tree is used, whether the luma (DUAL_TREE_ LUMA) or chroma components (DUAL_TREE_ CHROMA) are currently processed. The variable modeType specifies whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node. Output of this process is the variable allowBtSplit.

The variables parallelTtSplit and cbSize can be derived as specified in Table 10.

TABLE 10

|  | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

The variable allowBtSplit can be derived as follows. If one or more of the following conditions are true, allowBtSplit is set equal to FALSE: (i) cbSize is less than or equal to MinBtSizeY; (ii) cbWidth is greater than maxBtSize; (iii) cbHeight is greater than maxBtSize; (iv) mttDepth is greater than or equal to maxMttDepth; (v) treeType is equal to DUAL_TREE_CHROMA and (cbWidth/SubWidthC)*(cbHeight/SubHeightC) is less than or equal to 16; (vi) treeType is equal to DUAL_TREE_CHROMA and (cbWidth/SubWidthC) is equal to 4 and btSplit is equal to SPLIT_BT_VER; (vii) treeType is equal to DUAL TREE CHROMA and modeType is equal to MODE_TYPE_INTRA; and (viii) cbWidth*cbHeight is equal to 32 and modeType is equal to MODE_TYPE_INTER. Otherwise, if all of the following conditions are true, allowBtSplit is set equal to FALSE: (i) btSplit is equal to SPLIT_BT_VER; and (ii) y0+cbHeight is greater than pic height in luma samples. Otherwise, if all of the following conditions are true, allowBtSplit is set equal to FALSE: (i) btSplit is equal to SPLIT_BT_VER; (ii) cbHeight is greater than 64; and (iii) x0+cbWidth is greater than pic_width_in_luma_samples. Otherwise, if all of the following conditions are true, allowBtSplit is set equal to FALSE: (i) btSplit is equal to SPLIT_BT_HOR; (ii) cbWidth is greater than 64; and (iii) y0+cbHeight is greater than pic_height_in_luma_samples. Otherwise, if all of the following conditions are true, allowBtSplit is set equal to FALSE: (i) x0+cbWidth is greater than pic_width_in_luma_samples; (ii) y0+cbHeight is greater than pic_height_in_luma_samples; and (iii) cbWidth is greater than minQtSize. Otherwise, if all of the following conditions are true, allowBtSplit is set equal to FALSE: (i) btSplit is equal to SPLIT_BT_HOR; (ii) x0+cbWidth is greater than pic_width_in_luma_samples; and (iii) y0+cbHeight is less than or equal to pic_height_in_luma_samples. Otherwise, if all of the following conditions are true, allowBtSplit is set equal to FALSE: (i) mttDepth is greater than 0; (ii) partIdx is equal to 1; and (iii) MttSplitMode[x0][y0][mttDepth−1] is equal to parallelTtSplit. Otherwise, if all of the following conditions are true, allowBtSplit is set equal to FALSE: (i) btSplit is equal to SPLIT_BT_VER; (ii) cbWidth is less than or equal to 64; and (iii) cbHeight is greater than 64. Otherwise, if all of the following conditions are true, allowBtSplit is set equal to FALSE: (i) btSplit is equal to SPLIT_BT_HOR; (ii) cbWidth is greater than 64; and (iii) cbHeight is less than or equal to 64. Otherwise, allowBtSplit is set equal to TRUE.

According to aspects of the disclosure, an allowed ternary split process can be described as follows. Inputs to this process include a ternary split mode ttSplit, a coding block width cbWidth in luma samples, a coding block height cbHeight in luma samples, a location (x0, y0) of the top-left luma sample of the considered coding block relative to the top-left luma sample of the picture, a multi-type tree depth mttDepth, a maximum multi-type tree depth with offset maxMttDepth, a maximum ternary tree size maxTtSize, a variable treeType, and a variable modeType. The variable treeType specifies whether a single tree (SINGLE_TREE) or a dual tree is used to partition the coding tree node and, when a dual tree is used, whether the luma (DUAL_TREE_ LUMA) or chroma components (DUAL_TREE_ CHROMA) are currently processed. The variable modeType specifies whether intra (MODE_INTRA), IBC (MOD- E_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node. Output of this process is the variable allowTtSplit.

The variable cbSize can be derived as specified in Table 11.

TABLE 11

| | ttSplit == SPLIT_TT_VER | ttSplit == SPLIT_TT_HOR |
|---|---|---|
| cbSize | cbWidth | cbHeight |

The variable allowTtSplit can be derived as follows. If one or more of the following conditions are true, allowTtSplit is set equal to FALSE: (i) cbSize is less than or equal to 2*MinTtSizeY; (ii) cbWidth is greater than Min(64, maxTtSize); (iii) cbHeight is greater than Min(64, maxTtSize); (iv) mttDepth is greater than or equal to maxMttDepth; (v) x0+cbWidth is greater than pic_width_in_luma_samples; (vi) y0+cbHeight is greater than pic_height_in_luma_samples; (vii) treeType is equal to DUAL_TREE_CHROMA and (cbWidth/SubWidthC)*(cbHeight/SubHeightC) is less than or equal to 32; (viii) treeType is equal to DUAL_TREE_CHROMA and (cbWidth/SubWidthC) is equal to 8 and ttSplit is equal to SPLIT_TT_VER; (ix) treeType is equal to DUAL_TREE_CHROMA and modeType is equal to MODE_TYPE_INTRA; and (x) cbWidth*cbHeight is equal to 64 and modeType is equal to MODE_TYPE_INTER. Otherwise, allowTtSplit is set equal to TRUE.

According to aspects of the disclosure, a derivation process for neighboring block availability can be described as follows. Inputs to this process include the luma location (xCurr, yCurr) of the top-left sample of the current block relative to the top-left luma sample of the current picture, the luma location (xNbY, yNbY) covered by a neighboring block relative to the top-left luma sample of the current picture, the variable checkPredModeY specifying whether availability depends on the prediction mode, and the variable cIdx specifying the color component of the current block. An output of this process is the availability of the neighboring block covering the location (xNbY, yNbY), denoted as availableN.

The neighboring block availability availableN can be derived as follows. If one or more of the following conditions are true, availableN is set equal to FALSE: (i) xNbY is less than 0; (ii) yNbY is less than 0; (iii) xNbY is greater than or equal to pic width in luma samples; (iv) yNbY is greater than or equal to pic_height_in_luma_samples; (v) IsAvailable[cIdx][xNbY][yNbY] is equal to FALSE; (vi) the neighbouring block is contained in a different slice than the current block; (vii) the neighbouring block is contained in a different tile than the current block; and (viii) entropy_coding_sync_enabled_flag is equal to 1 and (xNbY>>CtbLog2SizeY) is greater than or equal to (xCurr>>CtbLog2SizeY)+1. Otherwise, availableN is set equal to TRUE.

When all of the following conditions are true, availableN is set equal to FALSE: (i) checkPredModeY is equal to TRUE; (ii) availableN is set equal to TRUE; and (iii) CuPredMode[0][xNbY][yNbY] is not equal to CuPredMode[0][xCurr][yCurr].

VI. Derivation of Partitioning Related Variables

The variable slice_type specifies the coding type of the slice according to Table 12, for example.

TABLE 12

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type can be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type can be equal to 2.

The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY, and MaxMttDepthC can be derived as follows. If slice_type is equal to 2 (I), the following applies:

$$MinQtLog2SizeY = MinCbLog2SizeY + \text{ph\_log2\_diff\_min\_qt\_min\_cb\_intra\_slice\_luma} \quad \text{(Eq. 39)}$$

$$MinQtLog2SizeC = MinCbLog2SizeY + \text{ph\_log2\_diff\_min\_qt\_min\_cb\_intra\_slice\_chroma} \quad \text{(Eq. 40)}$$

$$MaxBtSizeY = 1 \ll (MinQtLog2SizeY + \text{ph\_log2\_diff\_max\_bt\_min\_qt\_intra\_slice\_luma}) \quad \text{(Eq. 41)}$$

$$MaxBtSizeC = 1 \ll (MinQtLog2SizeC + \text{ph\_log2\_diff\_max\_bt\_min\_qt\_intra\_slice\_chroma}) \quad \text{(Eq. 42)}$$

$$MaxTtSizeY = 1 \ll (MinQtLog2SizeY + \text{ph\_log2\_diff\_max\_tt\_min\_qt\_intra\_slice\_luma}) \quad \text{(Eq. 43)}$$

$$MaxTtSizeC = 1 \ll (MinQtLog2SizeC + \text{ph\_log2\_diff\_max\_tt\_min\_qt\_intra\_slice\_chroma}) \quad \text{(Eq. 44)}$$

$$MaxMttDepthY = \text{ph\_max\_mtt\_hierarchy\_depth\_intra\_slice\_luma} \quad \text{(Eq. 45)}$$

$$MaxMttDepthC = \text{ph\_max\_mtt\_hierarchy\_depth\_intra\_slice\_chroma} \quad \text{(Eq. 46)}$$

$$CuQpDeltaSubdiv = \text{ph\_cu\_qp\_delta\_subdiv\_intra\_slice} \quad \text{(Eq. 47)}$$

$$CuChromaQpOffsetSubdiv = \text{ph\_cu\_chroma\_qp\_offset\_subdiv\_intra\_slice} \quad \text{(Eq. 48)}$$

Otherwise, if slice_type is qual to 0 (B) or 1 (P), the following applies:

$$MinQtLog2SizeY = MinCbLog2SizeY + \text{ph\_log2\_diff\_min\_qt\_min\_cb\_inter\_slice} \quad \text{(Eq. 49)}$$

$$MinQtLog2SizeC = MinCbLog2SizeY + \text{ph\_log2\_diff\_min\_qt\_min\_cb\_inter\_slice} \quad \text{(Eq. 50)}$$

$$MaxBtSizeY = 1 \ll (MinQtLog2SizeY + \text{ph\_log2\_diff\_max\_bt\_min\_qt\_inter\_slice}) \quad \text{(Eq. 51)}$$

$$MaxBtSizeC = 1 \ll (MinQtLog2SizeC + \text{ph\_log2\_diff\_max\_bt\_min\_qt\_inter\_slice}) \quad \text{(Eq. 52)}$$

-continued $$MaxTtSizeY = 1 \ll (MinQtLog2SizeY + ph\_log2\_diff\_max\_tt\_min\_qt\_inter\_slice) \quad \text{(Eq. 53)}$$

$$MaxTtSizeC = 1 \ll (MinQtLog2SizeC + ph\_log2\_diff\_max\_tt\_min\_qt\_inter\_slice) \quad \text{(Eq. 54)}$$

$$MaxMttDepthY = ph\_max\_mtt\_hierarchy\_depth\_inter\_slice \quad \text{(Eq. 55)}$$

$$MaxMttDepthC = ph\_max\_mtt\_hierarchy\_depth\_inter\_slice \quad \text{(Eq. 56)}$$

$$CuQpDeltaSubdiv = ph\_cu\_qp\_delta\_subdiv\_inter\_slice \quad \text{(Eq. 57)}$$

$$CuChromaQpOffsetSubdiv = ph\_cu\_chroma\_qp\_offset\_subdiv\_inter\_slice \quad \text{(Eq. 58)}$$

Then, the following applies:

$$MinQtSizeY = 1 \ll MinQtLog2SizeY \quad \text{(Eq. 59)}$$

$$MinQtSizeC = 1 \ll MinQtLog2SizeC \quad \text{(Eq. 60)}$$

$$MinBtSizeY = 1 \ll MinCbLog2SizeY \quad \text{(Eq. 61)}$$

$$MinTtSizeY = 1 \ll MinCbLog2SizeY \quad \text{(Eq. 62)}$$

VII. Block Partitioning at Picture Boundary

In some related examples such as VVC, when a coding block is across a picture boundary, and none of the conditions for allowing QT split, BT split, or TT split is met, implicit QT split can be applied to the coding block. For example, if all the variables allowQtSplit, allowTtSplit, and allowBtSplit are FALSE, then QT is implicitly used when a part of the coding block is outside the picture. However, this may not be the best solution in terms of coding efficiency in some cases.

The disclosure presents methods for improving coding efficiency when a coding block is across a picture boundary. According to aspects of the disclosure, an implicit binary split can be used when a current coding block or CTU is across the picture boundary, regardless of the settings of maximum multi-type tree depth, current multi-type tree depth, or minimum binary tree node size.

The implicit binary tree split can be performed by conditionally setting an initial value of a multi-type tree depth offset (e.g., the variable depthOffset in Table 7) according to whether the current coding block or CTU is across the picture boundary. The multi-type tree depth offset is added to a current maximum multi-type tree depth (e.g. MaxMttDepthY in single tree and dual-tree luma cases, or MaxMttDepthC in a dual tree chroma case), and the result can be used as a new maximum multi-type tree depth to determine whether the binary split is allowed (e.g., based on the allowed binary split process in the section of Partitioning Availability Processes).

Table 13 shows an exemplary modified coding tree unit syntax table.

TABLE 13

| | Descriptor |
|---|---|
| coding_tree_unit( ) { | |
|   xCtb = CtbAddrX << CtbLog2SizeY | |
|   yCtb = CtbAddrY << CtbLog2SizeY | |
|   if( slice_sao_luma_flag \|\| slice_sao_chroma_flag ) | |
|     sao( CtbAddrX, CtbAddrY ) | |
|   if( slice_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { | |
|       if( slice_num_alf_aps_ids_luma > 0 ) | |
|         alf_use_aps_flag | ae(v) |
|       if( alf_use_aps_flag ) { | |
|         if( slice_num_alf_aps_ids_luma > 1 ) | |
|           alf_luma_prev_filter_idx | ae(v) |
|       } else | |
|         alf_luma_fixed_filter_idx | ae(v) |
|     } | |
|     if( slice alf_chroma_idc = = 1 \|\| slice_alf_chroma_idc = = 3 ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |
|         alf_ctb_filter_alt_idx[ 0 ][ CtbAddrX ][ CtbAddrY ] | ae(v) |
|     } | |
|     if( slice_alf_chroma_idc = = 2 \|\| slice_alf_chroma_idc = = 3 ) { | |
|       alf_ctb_flag[ 2 ][ CtbAddrX ][ CtbAddrY ] | ae(v) |
|       if( alfctb_flag[ 2 ][ CtbAddrX ][ CtbAddrY ] | |
|         && alf_chroma_num_alt_filters_minus1 > 0 ) | |
|         alf_ctb_filter_alt_idx[ 1 ][ CtbAddrX ][ CtbAddrY ] | ae(v) |
|     } | |
|   } | |
|   if( slice_cc_alf_cb_enabled_flag ) | |
|     alf_ctb_cc_cb_idc[ CtbAddrX ][ CtbAddrY ] | ae(v) |
|   if( slice_cc_alf_cr_enabled_flag ) | |
|     alf_ctb_cc_cr_idc[ CtbAddrX ][ CtbAddrY ] | ae(v) |
|   x1 = xCtb + CtbSizeY | |
|   y1 = yCtb + CtbSizeY | |
|   mttDepthOffset = | |
|     (x1 > pic_width_in_luma_samples \|\| y1 > pic_height_in_luma_samples ) ? 1 : 0 | |
|   if( slice_type = = I && qtbtt_dual_tree_intra_flag ) | |
|     dual_tree_implicit_bt_split( xCtb, yCtb, CtbSizeY, 0, mttDepthOffset ) | |

TABLE 13-continued

Descriptor

```
    else {
        coding_tree( xCtb, yCtb, CtbSizeY, CtbSizeY, 1, 1, 0, 0, 0, mttDepthOffset, 0,
            SINGLE_TREE, MODE_TYPE_ALL )
    }
}
```

In Table 13, the variable x1 is a sum of an x-axis position of the current coding block and a width of the current coding block. If the variable x1 is greater than a width of the picture, the current coding block can be determined to be across the picture boundary and the multi-type tree depth offset mttDepthOffset is set as 1. The variable y1 is a sum of a y-axis position of the current coding block and a height of the current coding block. If the variable y1 is greater than a height of the picture, the current coding block can be determined to be across the picture boundary and the multi-type tree depth offset mttDepthOffset is set as 1. If the variable x1 is equal to or less than the width of the picture and the variable y1 is equal to or less than the height of the picture, the current coding block can be determined not to be across the picture boundary and the multi-type tree depth offset mttDepthOffset is set as 0. In addition, if the slice type of the current coding block is Intra and qtbtt_dual_tree_intra_flag is TRUE, a dual tree implicit BT split process can be applied to the current coding block and the multi-type tree depth offset mttDepthOffset can be used as the variable depthOffset in the dual tree implicit BT split process. Otherwise, a coding tree process can be applied to the current coding block and the multi-type tree depth offset mttDepthOffset can be used as the variable depthOffset in the coding tree process.

Table 14 shows an exemplary modified dual tree implicit BT split syntax table.

TABLE 14

Descriptor

```
dual_tree_implicit_bt_split( x0, y0, cbSize, cqtDepth, depthOffset ) {
    cbSubdiv = 2 * cqtDepth
    if( cbSize > 64 ) {
        if( cu_qp_delta_enabled_flag && cbSubdiv <= CuQpDeltaSubdiv ) {
            IsCuQpDeltaCoded = 0
            CuQpDeltaVal = 0
            CuQgTopLeftX = x0
            CuQgTopLeftY = y0
        }
        if( cu_chroma_qp_offset_enabled_flag && cbSubdiv <= CuChromaQpOffsetSubdiv ) {
            IsCuChromaQpOffsetCoded = 0
            CuQpOffsetCb = 0
            CuQpOffsetCb = 0
            CuQpOffsetCbCr = 0
        }
        dual_tree_implicit_qt_split( x0, y0, cbSize / 2, cqtDepth + 1, depthOffset )
        x1 = xCtb + CtbSizeY
        y1 = yCtb + CtbSizeY
        if( x1 < pic_width_in_luma_samples )
            dual_tree_implicit_qt_split( x1, y0, cbSize / 2, cqtDepth + 1, depthOffset )
        if( y1 < pic_height_in_luma_samples )
            dual_tree_implicit_qt_split( x0, y1, cbSize / 2, cqtDepth + 1, depthOffset )
        if( x1 < pic_width_in_luma_samples && y1 < pic_height_in_luma_samples )
            dual_tree_implicit_qt_split( x1, y1, cbSize / 2, cqtDepth + 1, depthOffset )
    } else {
        coding_tree( x0, y0, cbSize, cbSize, 1, 0, cbSubdiv, cqtDepth, 0, depthOffset, 0,
            DUAL_TREE_LUMA, MODE_TYPE_ALL )
        coding_tree( x0, y0, cbSize, cbSize, 0, 1, cbSubdiv, cqtDepth, 0, depthOffset, 0,
            DUAL_TREE_CHROMA, MODE_TYPE_ALL )
    }
}
```

In Table 14, the variable depthOffset can be set based on the variable mttDepthOffset in Table 13 when the dual tree implicit BT split process is determined to be used. In the dual tree implicit BT split process, the maximum tree depth can be determined based on the variable depthOffset.

When the variable cbSize is greater than 64, the dual tree implicit BT split process can be applied to a block which has the same position (x0, y0) as the current block and a half size of the current block, and the variable cqtDepth is increased by one. Further, when the variable x1 is less than the width of the current picture, the dual tree implicit BT split process can be applied to a block which has a position (x1, y0) and a half size of the current block, and the variable cqtDepth is increased by one. Further, when the variable y1 is less than the height of the current picture, the dual tree implicit BT split process can be applied to a block which has a position (x0, y1) and a half size of the current block, and the variable cqtDepth is increased by one. Further, when the variable x is less than the width of the current picture and the variable y1 is less than the height of the current picture, the dual tree implicit BT split process can be applied to a block which has a position (x1, y1) and a half size of the current block, and the variable cqtDepth is increased by one.

When the variable cbSize is not greater than 64, the coding tree process can be applied to both luma and chroma components of the current block. The variable depthOffset is passed to the coding tree process.

In one embodiment, the implicit binary split is not allowed to be applied at the picture boundary when a partition from the implicit binary split is across a VPDU boundary. In some embodiments, the implicit binary split is not allowed to be applied at the picture boundary even when the VPDU is partially outside the picture.

In one embodiment, the implicit binary split can be allowed to be applied at the picture boundary regardless of whether a partition from the implicit binary split is across a VPDU boundaries or not.

VIII. Flowchart

Figure 17:
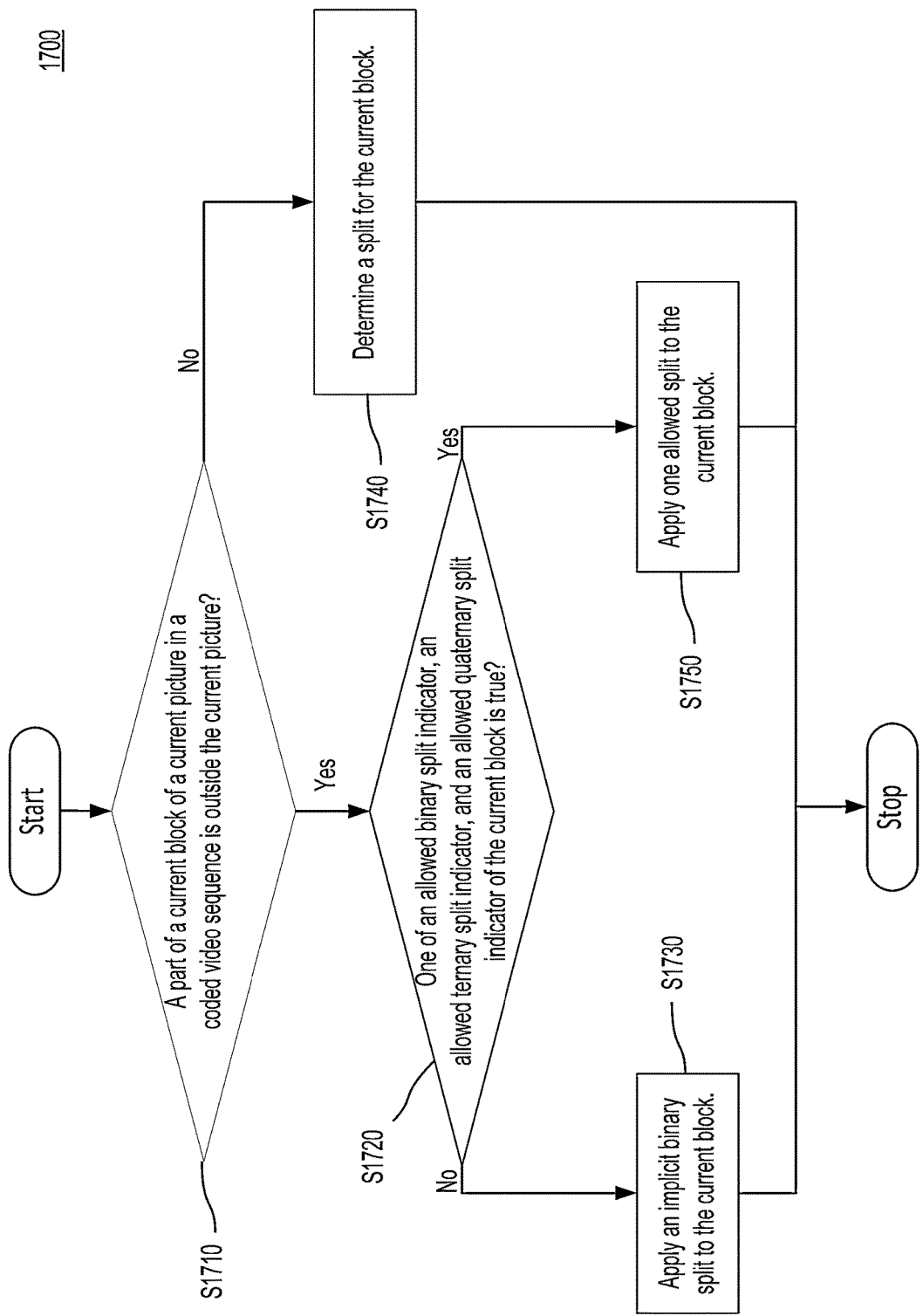
FIG. 17 shows an exemplary flowchart in accordance with an embodiment.

FIG. 17 shows a flow chart outlining an exemplary process (1100) according to an embodiment of the disclosure. In various embodiments, the process (1100) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1700) is implemented in software instructions, thus when the processing circuitry executes the software instructions, the processing circuitry performs the process (1700).

The process (1700) may generally start at step (S1710), where the process (1700) determines whether a part of a current block of a current picture in a coded video sequence is outside the current picture. When the part of the current block is determined to be outside the current picture, the process (1700) proceeds to step (S1720). Otherwise, the process (1700) proceeds to step (S1740).

At step (S1720), the process (1700) determines whether one of an allowed binary split indicator, an allowed ternary split indicator, and an allowed quaternary split indicator of the current block is true. When none of the allowed binary split indicator, the allowed ternary split indicator, and the allowed quaternary split indicator is true, the process (1700) proceeds to step (S1730). Otherwise, the process (1700) proceeds to step (S1750).

At step (S1730), the process (1700) applies an implicit binary split to the current block.

At step (S1740), the process (1700) determines a split for the current block.

At step (S1750), the process (1700) applies one allowed split to the current block. Then, the process (1700) terminates.

In an embodiment, the process (1700) determines whether a sum of an x-axis position of the current block and a width of the current block is greater than a width of the current picture.

In an embodiment, the process (1700) determines whether a sum of a y-axis position of the current block and a height of the current block is greater than a height of the current picture.

In an embodiment, the process (1700) determines an initial value of a multi-type tree depth offset as a first value when the part of the current block is outside the current picture.

In an embodiment, the process (1700) determines the initial value of the multi-type tree depth offset as a second value when the part of the current block is not outside the current picture.

In an embodiment, the process (1700) determines a maximum multi-type tree depth of the implicit binary split based on the multi-type tree depth offset.

In an embodiment, the first value is 1 and the second value is 0.

In an embodiment, the current block is intra coded and luma and chroma components of the current block are associated with two separate coding tree structures.

In an embodiment, the process (1700) determines whether a partition from the implicit binary split is across a virtual process data unit boundary. The process (1700) applies the implicit binary split to the current block when the partition from the implicit binary split is not across the virtual process data unit boundary.

IX. Computer System

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
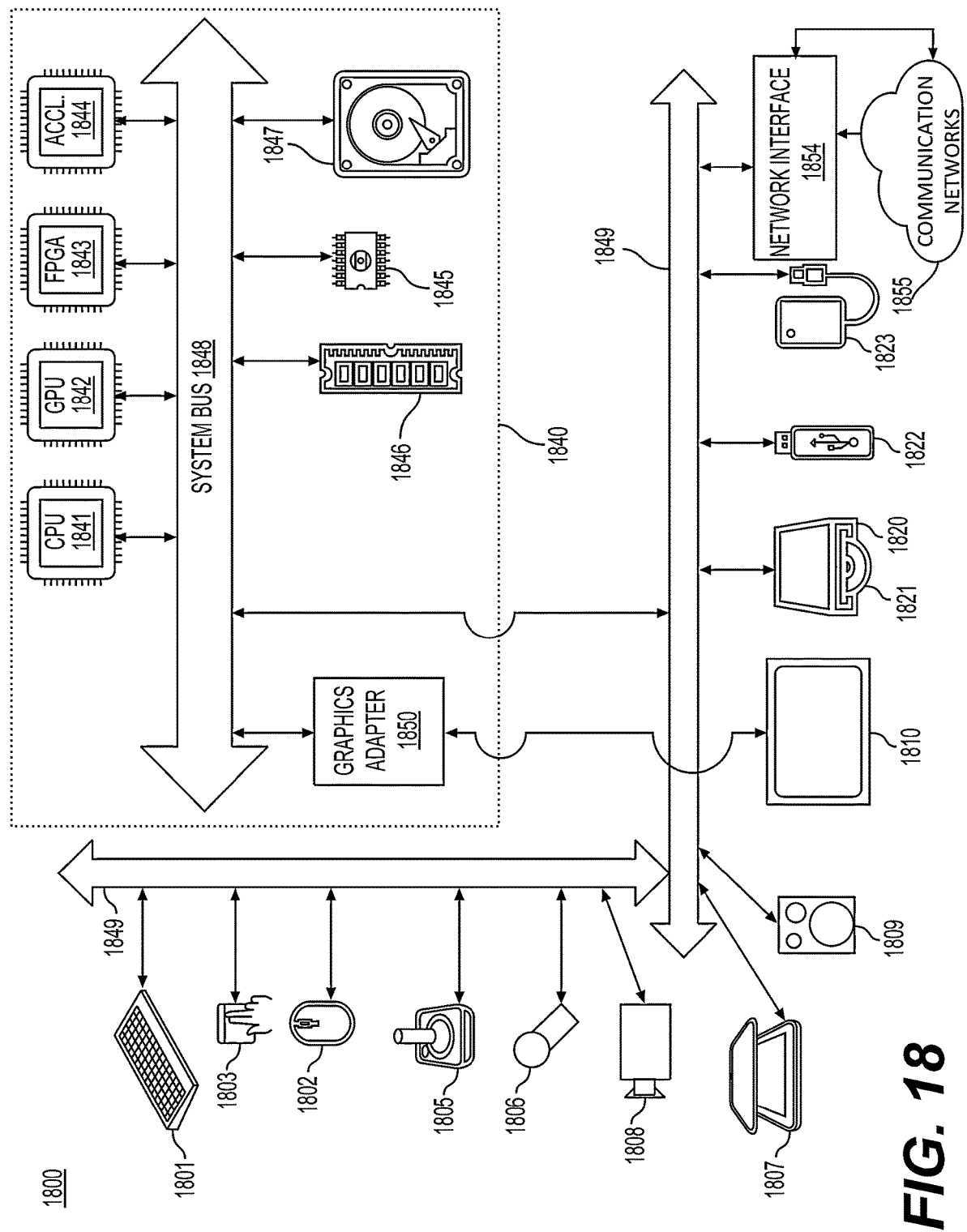
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1810)) can be connected to a system bus (1848) through a graphics adapter (1850).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include a network interface (1854) to one or more communication networks (1855). The one or more communication networks (1855) can for example be wireless, wireline, optical. The one or more communication networks (1855) can further be local, wide-area, metropolitan, vehicular and industrial, real-time, delay-tolerant, and so on. Examples of the one or more communication networks (1855) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through the system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

AMVP: Advanced Motion Vector Prediction
ASIC: Application-Specific Integrated Circuit
ATMVP: Alternative/Advanced Temporal Motion Vector Prediction
BMS: Benchmark Set
BV: Block Vector
CANBus: Controller Area Network Bus
CB: Coding Block
CD: Compact Disc
CPR: Current Picture Referencing
CPUs: Central Processing Units
CRT: Cathode Ray Tube
CTBs: Coding Tree Blocks
CTUs: Coding Tree Units
CU: Coding Unit
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HRD: Hypothetical Reference Decoder
IBC: Intra Block Copy
IC: Integrated Circuit
JEM: Joint Exploration Model
LAN: Local Area Network
LCD: Liquid-Crystal Display
LTE: Long-Term Evolution
MV: Motion Vector
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SCC: Screen Content Coding
SEI: Supplementary Enhancement Information
SNR: Signal Noise Ratio
SSD: Solid-state Drive
TUs: Transform Units
USB: Universal Serial Bus
VUI: Video Usability Information
VVC: Versatile Video Coding

What is claimed is:

1. A method for video encoding, the method comprising:
    determining, by processing circuitry of a video encoder, whether a part of a current block is outside a current picture that is being encoded;
    setting an initial value of a multi-type tree depth offset based on the determination whether the part of the current block is outside the current picture;
    determining whether an implicit binary split is allowed based on a new maximum multi-type tree depth value, which is calculated by adding the initial value of the multi-type tree depth offset to a current maximum multi-type tree depth; and
    applying, by the processing circuitry, the implicit binary split to the current block in response to a determination that the implicit binary split is allowed.

2. The method of claim 1, wherein the determining whether the part of the current block is outside the current picture comprises at least one of:
    determining whether a sum of an x-axis position of the current block and a width of the current block is greater than a width of the current picture; and
    determining whether a sum of a y-axis position of the current block and a height of the current block is greater than a height of the current picture.

3. The method of claim 1, further comprising:
    setting the initial value of the multi-type tree depth offset as a first value in response to the part of the current block being outside the current picture; and
    setting the initial value of the multi-type tree depth offset as a second value in response to the part of the current block not being outside the current picture.

4. The method of claim 3, wherein the first value is 1 and the second value is 0.

5. The method of claim 1, further comprising intra coding the current block, wherein luma and chroma components of the current block are associated with two separate coding tree structures.

6. An encoding apparatus, comprising:
    processing circuitry configured to:
        determine whether a part of a current block is outside a current picture that is being encoded;
        set an initial value of a multi-type tree depth offset based on the determination whether the part of the current block is outside the current picture;
        determine whether an implicit binary split is allowed based on a new maximum multi-type tree depth value, which is calculated by adding the initial value of the multi-type tree depth offset to a current maximum multi-type tree depth; and
        apply the implicit binary split to the current block in response to a determination that the implicit binary split is allowed.

7. The apparatus of claim 6, wherein the processing circuitry determines whether the part of the current block is outside the current picture by determining whether a sum of an x-axis position of the current block and a width of the current block is greater than a width of the current picture.

8. The apparatus of claim 6, wherein the processing circuitry determines whether the part of the current block is outside the current picture by determining whether a sum of a y-axis position of the current block and a height of the current block is greater than a height of the current picture.

9. The apparatus of claim 6, wherein the processing circuitry is further configured to:
    set the initial value of the multi-type tree depth offset as a first value in response to the part of the current block being outside the current picture; and
    set the initial value of the multi-type tree depth offset as a second value in response to the part of the current block not being outside the current picture.

10. The apparatus of claim 9, wherein the first value is 1 and the second value is 0.

11. The apparatus of claim 6, wherein the processing circuitry is further configured to intra code the current block, wherein luma and chroma components of the current block are associated with two separate coding tree structures.

12. A non-transitory computer-readable storage medium storing instructions which, when executed by at least one processor, cause the at least one processor to perform:
   determining whether a part of a current block is outside a current picture that is being encoded;
   setting an initial value of a multi-type tree depth offset based on the determination whether the part of the current block is outside the current picture;
   determining whether an implicit binary split is allowed based on a new maximum multi-type tree depth value, which is calculated by adding the initial value of the multi-type tree depth offset to a current maximum multi-type tree depth; and
   applying the implicit binary split to the current block in response to a determination that the implicit binary split is allowed.

13. The non-transitory computer-readable storage medium of claim 12, wherein the determining whether the part of the current block is outside the current picture comprises at least one of:
   determining whether a sum of an x-axis position of the current block and a width of the current block is greater than a width of the current picture; and
   determining whether a sum of a y-axis position of the current block and a height of the current block is greater than a height of the current picture.

14. The non-transitory computer-readable storage medium of claim 12, wherein the stored instructions cause the at least one processor to perform:
   setting the initial value of the multi-type tree depth offset as a first value in response to the part of the current block being outside the current picture; and
   setting the initial value of the multi-type tree depth offset as a second value in response to the part of the current block not being outside the current picture.

15. The non-transitory computer-readable storage medium of claim 14, wherein the first value is 1 and the second value is 0.

* * * * *